(12) United States Patent
Roth et al.

(10) Patent No.: US 12,400,196 B1
(45) Date of Patent: Aug. 26, 2025

(54) COMMUNICATIONS METHODS AND SYSTEMS FOR SECURE ACCOUNT FUND TRANSFER USING A THIRD PARTY

(71) Applicant: UIPCO, LLC, San Antonio, TX (US)

(72) Inventors: Valerie Ann Roth, San Antonio, TX (US); Charise Renee Whitaker, San Antonio, TX (US); Oscar Guerra, San Antonio, TX (US); Ashley Raine Philbrick, San Antonio, TX (US); Paula Ann Whittington, Helotes, TX (US); Kelly Q. Baker, San Antonio, TX (US); Will Kerns Maney, Jr., San Antonio, TX (US); Sumita T. Jonak, San Antonio, TX (US); Pragya Kamal, Phoenix, AZ (US); Ryan Thomas Russell, San Antonio, TX (US); Joel S. Hartshorn, Liberty Lake, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 249 days.

(21) Appl. No.: 18/166,031

(22) Filed: Feb. 8, 2023

Related U.S. Application Data

(63) Continuation-in-part of application No. 16/728,022, filed on Dec. 27, 2019, now abandoned.

(51) Int. Cl.
*G06Q 40/02* (2023.01)
*G06Q 20/08* (2012.01)
*G06Q 20/22* (2012.01)

(52) U.S. Cl.
CPC ....... *G06Q 20/0855* (2013.01); *G06Q 20/229* (2020.05); *G06Q 40/02* (2013.01)

(58) Field of Classification Search
CPC ... G06Q 40/02; G06Q 20/0855; G06Q 20/229
(Continued)

(56) References Cited

U.S. PATENT DOCUMENTS 5,999,596 A 12/1999 Walker
7,603,316 B1 10/2009 Fife
(Continued)

FOREIGN PATENT DOCUMENTS

CN 104125078 A 10/2014

OTHER PUBLICATIONS

Non-Final Office Action mailed Jun. 7, 2021 for U.S. Appl. No. 16/728,022.
(Continued)

*Primary Examiner* — William E Rankins
(74) *Attorney, Agent, or Firm* — Plumsea Law Group, LLC

(57) ABSTRACT

A method and system for securely communicating with third parties who are authorized to control access to funds in a banking account held by a financial institution is disclosed. The method and system are particularly useful when the third party does not have direct access to account controls (for example, through a secure web portal or a secure banking application). While joint account holders, or other authorized users, of the banking account may communicate directly through an account management service, communication with the third party is mediated using a separate messaging service, such as a short messaging service (SMS). An authorization token may also be used as part of the approval process.

20 Claims, 16 Drawing Sheets

(58) Field of Classification Search
USPC .......................................................... 705/35
See application file for complete search history.

(56) References Cited

U.S. PATENT DOCUMENTS

| | | |
|---|---|---|
| 9,098,675 B1 | 8/2015 | Roth |
| 9,450,958 B1 | 9/2016 | Saylor |
| 10,445,739 B1* | 10/2019 | Sahni .................. G06Q 20/405 |
| 10,601,816 B1 | 3/2020 | Stickle |
| 2005/0279824 A1 | 12/2005 | Anderson |
| 2007/0078760 A1 | 4/2007 | Conaty |
| 2008/0255947 A1 | 10/2008 | Friedman |
| 2008/0319887 A1 | 12/2008 | Pizzi |
| 2010/0325019 A1 | 12/2010 | Avery |
| 2014/0164154 A1 | 6/2014 | Ramaci |
| 2017/0091699 A1 | 3/2017 | Mueller |
| 2018/0144318 A1 | 5/2018 | Sharma |
| 2020/0012811 A1 | 1/2020 | Walters |
| 2020/0118076 A1 | 4/2020 | Ballaro |

OTHER PUBLICATIONS

Non-Final Office Action mailed Jul. 7, 2022 for U.S. Appl. No. 16/728,022.
Non-Final Office Action mailed Nov. 8, 2022 for U.S. Appl. No. 16/728,022.

\* cited by examiner ated upon illustrating the principles of the disclosure. Moreover, in the figures, like reference numerals designate corresponding parts throughout the different views.

COMMUNICATIONS METHODS AND SYSTEMS FOR SECURE ACCOUNT FUND TRANSFER USING A THIRD PARTY

CROSS-REFERENCE TO RELATED APPLICATIONS

This application is a continuation in part of U.S. patent application Ser. No. 16/728,022, filed Dec. 27, 2019, and titled "Communications Methods and Systems for Secure Account Fund Transfer Using a Third Party," which is incorporated by reference herein in its entirety.

TECHNICAL FIELD

The present disclosure generally relates to a method and system for requesting and receiving approval for the use of funds in a shared account, and specifically to a method and system for granting authorization to a particular amount of funds based on a secure and context-specific real-time request.

BACKGROUND

Financial account management tools have become an increasingly important resource for the average consumer. Financial services, particularly those now available for use via computing devices, can provide consumers the versatility and freedom to control their assets and credit. However, consumers with many different financial accounts, such as credit card accounts, utility accounts, mortgage accounts, etc., may have trouble keeping current with account balances, payments and other transactions. The consequences of mis-management may result in penalties being assessed against the consumer by the providing the accounts. For example, penalties may be associated with late payments or balance thresholds that are exceeded by a consumer. This type of issue is exacerbated when the account is co-held (e.g., a joint banking account) and one account holder incurs expenses that the other account holder is unaware of, at least until some time has passed following the transaction. For example, couples or parent-child account members may use a joint bank account and have joint credit or debit card accounts, whereby each person in the group individually draws on the same account and independently charges purchases to the joint account. If prompt communication regarding each purchase is not provided to the other members of the group, the charges may reach the credit card limit and/or the account may become overdrawn.

Thus, the costs associated with failures to communicate these payments to all account holders can be significant. Furthermore, in cases of a joint account in which one person is a guardian or the "primary owner" (such as a parent) and the other is a dependent or a "secondary owner" (such as a child), the primary owner can have a strong interest in reviewing some or all financial transactions related to the joint financial transactions in order to monitor expenditures and ensure that money is spent according to a proposed budget or other their personal expectations. Conventional methods of managing financial activities of other account holders (e.g., a joint bank account) do not provide a fine level of control or granularity for the primary owner to customize and personalize their expectations and limits of account-related financial activities. Additionally, conventional methods do not provide ways to authorize transactions when the primary account owner is unavailable to approve the transaction.

There is a need in the art for a system and method that addresses the shortcomings discussed above.

SUMMARY

In one aspect, a method for allowing delegates to securely manage access to funds held in a bank account includes steps of establishing communication between an account management service and a banking application running on a user device, receiving information about a fund request for a requested amount from the user of the user device through at the account management service, converting the information about the fund request into a text-based message, retrieving contact information for a delegate authorized to approve the fund request, and automatically generating and sending a text-based message from the account management service to a delegate device associated with the delegate through a messaging service. The text-based message includes information about the fund request. The method further includes steps of receiving an approval in the form of a text-based response from the delegate device, and automatically authorizing a release of the requested amount of the funds for use by the user in response to receiving the approval.

In another aspect, a method for allowing delegates to securely manage access to funds held in a bank account includes steps of establishing communication between an account management service and a banking application running on a user device, receiving information about a fund request for a requested amount from the user of the user device through at the account management service, converting the information about the fund request into a text-based message, retrieving contact information for a delegate authorized to approve the fund request, retrieving an authorization token, and automatically generating and sending a text-based message to a delegate device associated with the delegate through a messaging service. The text-based message includes information about the fund request and the authorization token. The method further includes steps of receiving the authorization token from the user device at the account management service, and automatically authorizing a release of the requested amount of the funds for use by the user in response to receiving the authorization token.

In another aspect, a system for allowing delegates to manage access to funds held in a bank account in a secure manner includes a requester interface for receiving fund requests from a user, an approval module that communicates with a financial institution holding the bank account when the fund request is approved, and a delegate communication module for communicating fund requests to a delegate authorized to approve the fund request. The delegate communication module communicates with the delegate using a short messaging service.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a method and system for securely communicating with third parties who are authorized to control access to funds in a banking account held by a financial institution, when the third party does not have direct access to account controls (for example, through a secure web portal or a secure banking application). While joint account holders, or other authorized users, of the banking account may communicate directly through an account management service, communication with the third party is mediated using a separate messaging service, such as a short messaging service (SMS). Thus, the exemplary systems and methods facilitate converting fund requests made through forms into text-based messages that can be sent via SMS and received by the third party who may not have access to secure web portals or secure banking applications. The exemplary systems and methods further facilitate receiving a text-based response from the third party to determine if the fund request has been approved.

By using a separate communication channel to relay fund requests to a third party, the exemplary systems and methods facilitate improved security compared to systems that would require giving the third party direct access to account controls through a secure web portal and/or secure banking application. Moreover, the embodiments further provide increased security by using a security filter to remove any information from the text-based message that could be used to compromise the user's account.

Figure 1:
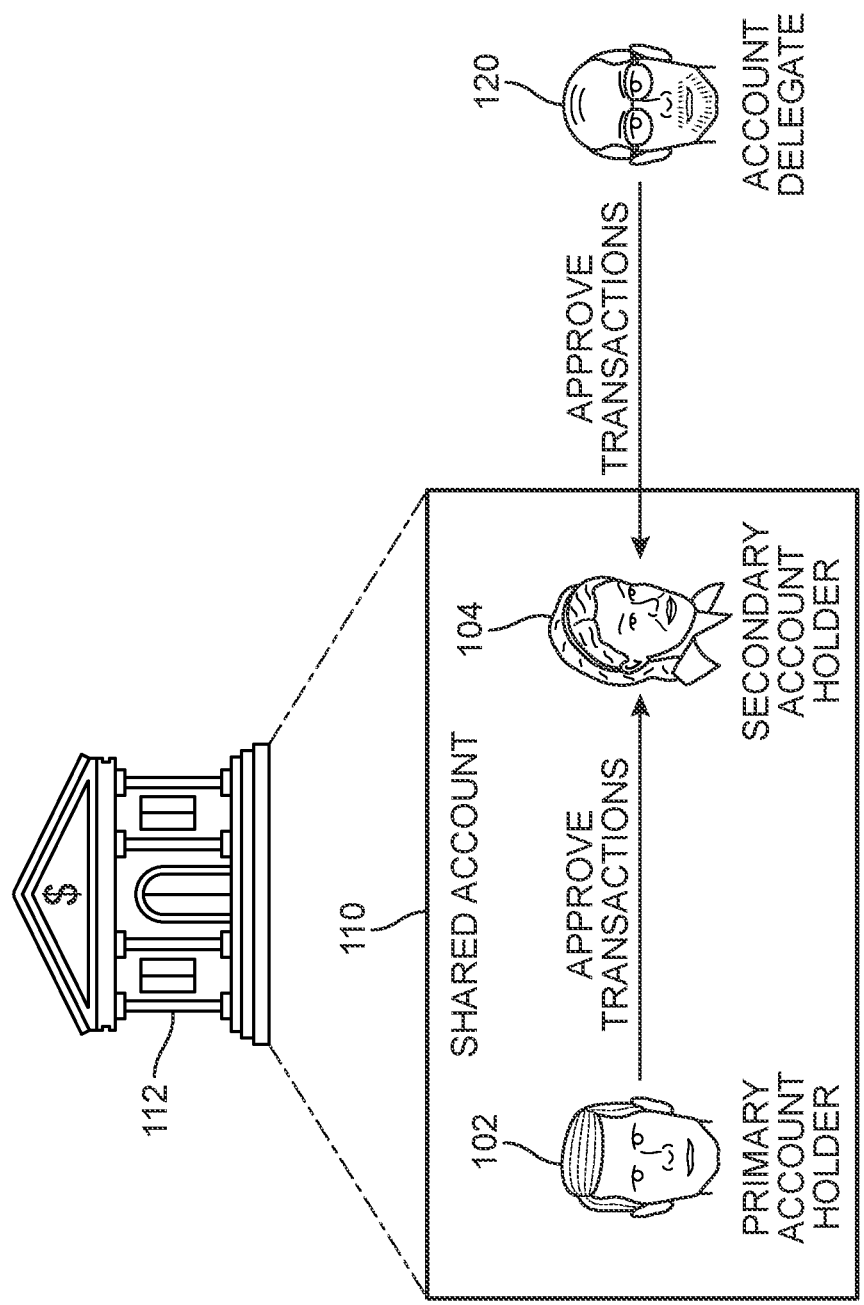
FIG. 1 is a schematic view of a configuration in which a primary account holder and an account delegate can approve transactions for a secondary account holder who shares a bank account with the primary account holder, according to an embodiment.

FIG. 1 is a schematic view of a scenario in which a primary account holder 102 shares a financial account 110 with a secondary account holder 104, according to an embodiment. In this case, both primary account holder 102 and secondary account holder 104 are members or customers of a financial institution 112, which maintains financial account 110. As used herein, a "primary" user, owner, account holder, or member may refer to a person or entity that is fully authorized to manage and access all aspects of a secured resource. Some non-limiting examples include an employer, parent, supervisor, spouse, or other custodian of a secured resource. In contrast, a "secondary" user, owner, account holder, or member is a person who may be provided access to the secured resource, but whose access is regulated by a primary owner. Some non-limiting examples include a child, dependent, minor, employee, spouse, volunteer, or other person who may need to access the secured resource, but whose usage must be regulated or monitored.

In the example of FIG. 1, primary account holder 102 may be a father, and secondary account holder 104 may be his daughter. In this case, secondary account holder 104 may be a student in college who is permitted access to some funds provided by her parents via shared financial account 110.

In this example, primary account holder 102 may have the ability to control how funds are disbursed to secondary account holder 104. For example, primary account holder 102 could have the ability to require that all withdrawals, transfers, or other financial transactions made by secondary account holder 104 be approved. This approval could be provided directly by primary account holder 102, or by some other party, referred to hereafter as a "third party approver," "delegate," or "surrogate". An approver, surrogate, or delegate is a person who has been given the power to determine whether a transaction or set of transactions or other use of the secured resource is permitted for a specific secondary user. In other words, the delegate may approve or deny requests for specific transactions (for example, a withdrawal of funds from the shared account) made by a secondary user or account holder.

As seen in FIG. 1, an account delegate 120 is also able to approve transactions, such as withdrawals, transfers, or other transactions, which may be made by secondary account holder 104. In this scenario, account delegate 120 may be a grandfather to secondary account holder 104. This arrangement helps ensure that someone is always available to approve or reject fund requests even when primary account holder 102 is unavailable.

The term "financial institution" shall refer to any institution that holds funds for others, including without limitation banks, savings and loans, credit unions, colleges or universities, and accounts that may be accessed through ATMs. In addition, the term "financial institution" shall also refer to credit card issuers. Also, the terms "merchant" and "retailer" shall include any person, entity, distributor system, software, and/or hardware that is a provider or broker of goods/services, and includes any other entity in the distribution chain of goods/services. For example, some common merchant/retailers may include a grocery store, a retail store, a travel agency, a service provider, a public-service utility, a school, a library, an on-line merchant, a government agency, and so on. A non-typical merchant may be a host of a garage sale or a host of a fund-raising activity, or other independent sellers. Generally, a consumer may communicate or interact with a merchant in person (e.g., in person at a store), telephonically, or electronically (e.g., from a computer via the Internet).

Although the exemplary embodiment depicts a scenario in which a parent and child share a joint banking account, other scenarios involving primary and secondary account holders are also possible. For example, in another embodiment, the primary account holder may be an insurance company from whom the secondary account holder has purchased an insurance policy to cover his or her car, rental unit or home, for example. The policy holder (who would be the secondary account holder in this example) may have been provided with a chip card so that he or she may make purchases and charge those purchases to the insurance company. For example, the insurance company may have a list of approved providers that the policy holder is invited to work with or shop from. In those cases, the insurance company would like to retain control over the amounts charged to the chip card. Moreover, to the extent that employees within the insurance company may be unavailable, the insurance company may decide to appoint certain persons who are not employees of the insurance company, such as agents, adjusters or contactors, to act as delegates in determining whether a particular transaction should be approved. Thus, the embodiments described herein may apply to cases in which an insurance company is the primary account holder.

In other cases, the financial institution may be an insurance company holding funds owed to an insured party (for example, a home owner whose home has been damaged) or to an injured party whom the insured has injured, and to whom the insured is liable for the damages the insured caused to the injured party (such as person who was injured in a traffic accident caused by the insured). In these cases, the primary account holder may be the insured party or may be the injured party. In those cases, the secondary account holder may be a party providing services to the insured homeowner (a plumber, for example) or to the injured party (a surgeon, for example). In either of these possible scenarios, should the secondary account holder (the plumber or the surgeon) submit an invoice for payment, the primary account holder (either the insured party or the injured party in these scenarios) may delegate approval or denial decisions to a surrogate whenever the primary account holder may be unavailable.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. Security systems use this identity when determining if a subject can access an object. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. As a general matter, three main methods of authentication include (a) user knowledge, such as a password or PIN; (b) user possession, such as a key, smart card, CAC (Common Access Card), PIV card (Personal Identity Verification card), RSA, or other card or token, magnetic stripe cards, certificates with a digital signature, etc.; and (c) biometric factors, such as voice recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The most common usage will be to bank accounts or other instruments offered by financial institutions, but other types of resources such as company or organizational resources, physical objects such as vehicles, can also be managed by the tools as discussed herein. As used herein, a "financial transaction account," also referred to herein as a "transaction account," is a specific type of secured resource that may include a bank account, a credit account, etc. For example, a bank account may refer to a savings account, a checking account, a money-market account, etc. and a credit account may refer to a transaction account associated with a pre-approved line of credit. A transaction refers to any type of action or event that is linked to a use or access of a secured resource.

While several specific examples of account management methods and systems for co-owned accounts will be described below, it is to be understood that the various aspects and features of each embodiment may be applied to any of the particular applications discussed herein. Thus, in some embodiments, the system may be offered as a stand-alone account management system or as a component of an integrated software solution for account management. In another embodiment, the system can be integrated into existing business and financial processes and products.

Figure 2:
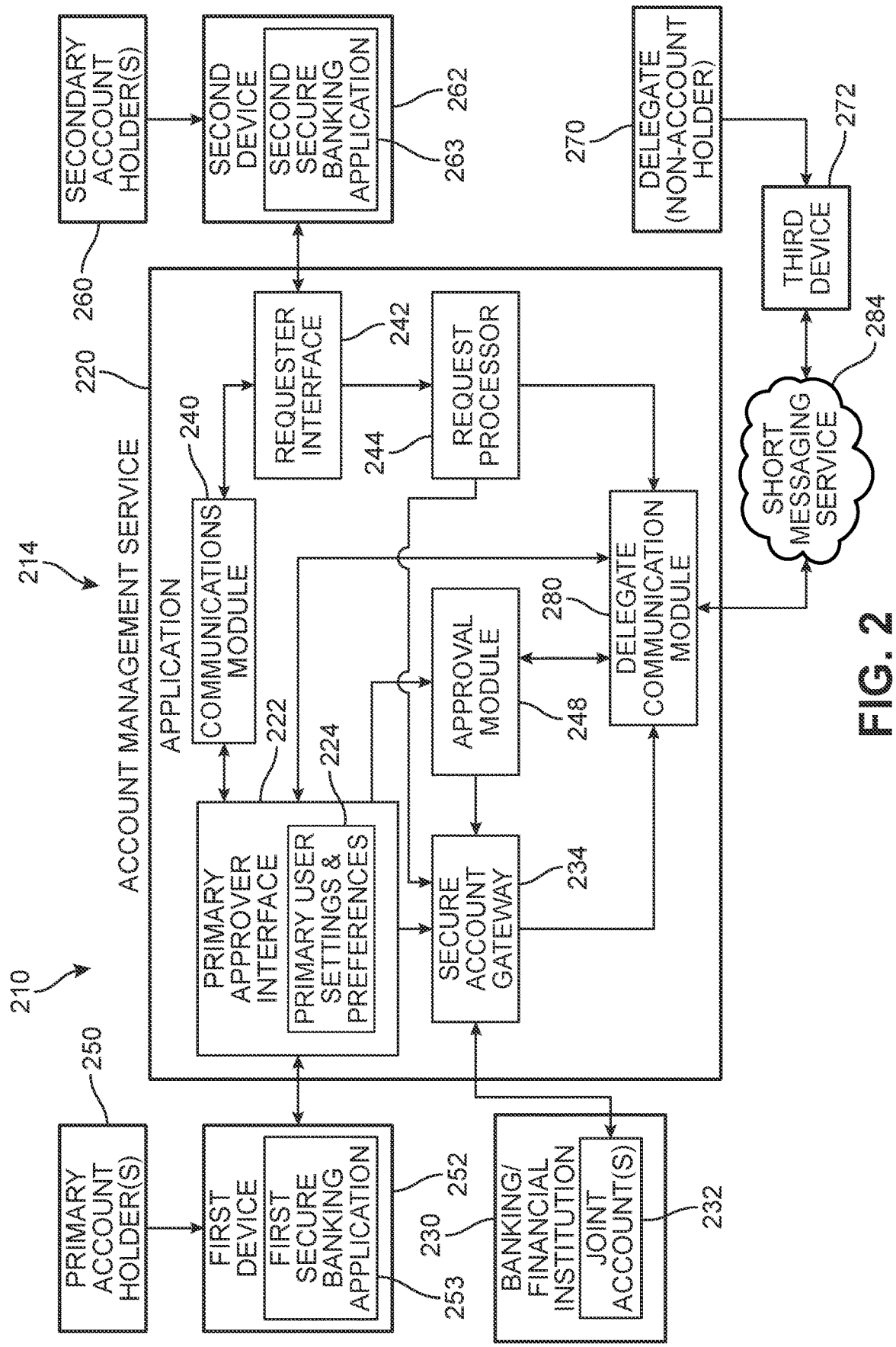
FIG. 2 is a schematic view of an account management architecture, according to an embodiment.

FIG. 2 is a schematic view of an account management architecture 210 (or simply, architecture 210) that facilitates approving financial transactions (such as fund withdrawals) that may be requested by a secondary account holder 260 with less than full account access. Architecture 210 includes an account management service 214 (or account management platform) that is used to manage aspects of a banking account (or other financial account) and to facilitate approvals for transactions made by secondary account holder 260.

Account management service 214 (or simply, service 214) further includes various provisions that provide the ability for primary account holder 250 to approve fund requests from secondary account holder 260 in a secure manner. In particular, service 214 facilitates communication between a first computing device ("first device") 252 that for purposes of illustration will be used by primary account holder 250 and a second computing device ("second device") 262 that for purposes of illustration will be used by secondary account holder 260. The devices can access and make use of account management service 214 that works in conjunction with a fund management application ("application") 220. Application 220 can be configured to release funds for use by a secondary user from a registered joint account 232 associated with a bank or other financial institution 230 (or other secured resource) when approval of a specific request is received.

To communicate with service 214, each of first device 252 and second device 262 may be configured to run a local application that communicates with service 214. For banking, the local application may be a banking application. For example, first device 252 may run a first secure banking application 253, while second device 262 may run a second secure banking application 263. These banking applications may be configured to communicate with service 214 directly, using, for example, application programming interfaces (APIs) associated with service 214. This allows communication to be performed in a secure manner, as each device may need an appropriate API key and/or other authentication information to send and/or receive information from service 214. Moreover, the information exchanged between these applications and service 214 can take on a variety of different formats. In some cases, the information could be sent as structured data, rather than as simply strings of characters. In some cases, form data can be exchanged.

The primary account holder 250 can enroll his or her secured resource, such as a bank account, for management through service 214. Thus, in some embodiments, the financial institution 230 can be configured to connect and/or facilitate the flow of information associated with the joint account 232 via a secure account gateway ("gateway") 234 to the service 214 and receive instructions regarding the joint account 232 through the gateway 234. The primary account holder 250 can register for the service through first device 252 and interact with the application 220 via a primary approver interface 222 which is configured to offer the management tools and features for the selected joint account. The primary account holder 250 can create and modify primary user settings and preferences 224 that will be used to determine the transaction circumstances and context in which an approval will be required, as well as which persons are authorized to provide such approval.

When a secondary account holder 260 intends to make a purchase or attempt some use of a secured resource regulated by the service 214, in some embodiments, he or she may opt to first review the conditions of such use through a requester interface 242 via second device 262. If the intended transaction falls outside the scope of any controls and conditions identified by the primary account holder 250, the secondary account holder 260 may proceed with the transaction without delay. If however, the intended transaction is of a type or amount that matches a pre-defined condition established by the primary account holder 250, the secondary account holder 260 may enter the necessary information about the transaction through requester interface 242 to generate a request for approval of the desired transaction. The request can be received by a request processor 244, which can determine, based on access to information about the current availability of the secured resource and the settings selected by the primary account holder 250, how the request should be handled. A communications module 240 can generate a message or notification regarding the request for presentation to the designated approver, which may include the primary account holder 250. Submission of an approval response can trigger a release of the requested funds via a primary approval module 248 that coordinates directly with the financial institution 230 to ensure only the approved amount is made available to the secondary account holder 260.

In some cases, primary account holder 250 may be unavailable to approve fund requests or other transactions. In such cases, approval can be provided by a delegate 270. In some cases, delegate 270 may not have direct access to service 214. This may occur for various reasons. For instance, delegate 270 may not be named on joint account 232 and/or may not have any account with the associated financial institution 230. This may limit the ability of service 214 to communicate with delegate 270 in a secure manner. In such cases, therefore, it may be necessary to utilize a separate system for facilitating communication between delegate 270 and service 214.

Referring to FIG. 2, architecture 210 may further include a delegate communication module 280. Delegate communication module 280 includes provisions for communicating with a delegate to obtain approval for fund requests and other transactions. Details of delegate communication module 280 are described in further detail below and shown in FIG. 6.

Communication between delegate communication module 280 and delegate 270 is mediated by a short messaging service 284, also known as an SMS. A short messaging service is a text-based messaging service that is integrated into many telephone, internet, and mobile device systems. SMS uses standardized communication protocols to pass text messages between mobile devices and/or other devices utilize the SMS. As seen in FIG. 2, delegate communication module 280 passes messages to third device 272 over SMS 284.

Using the exemplary configuration, architecture 210 provides two distinct modes of communication. These include a first mode of communication that occurs through account management service 214. Specifically, when primary account holder 250 is available to approve a fund request from secondary account holder 260, all communication is mediated directly between each account holder's device (specifically, an application running on their device) and account management service 214. This mode of communication is available to account holders or other users who have the proper authentication to interact directly with service 214. This authentication may occur via passwords, API keys, or other known methods of authentication.

A second mode of communication occurs through short messaging service 284. Specifically, when primary account holder 250 is unavailable to approve a fund request from secondary account holder 260, communication with delegate 270 is mediated through short messaging service 284, since third device 272 is not able to communicate directly with service 214. By contrast with the first mode of communication, in which devices communicate directly with an account management service using authenticated methods, this second mode of communication does not require that the delegate be authenticated by the account management service.

It may be appreciated that communication between different components of architecture 210 can be accomplished using a variety of different communication systems and using a variety of different communication protocols. In different embodiments, various devices, entities, and modules are configured to communicate with one another, for example via a Wi-Fi, cellular, or other network connection and make use of and receive and share data with service 214. In some examples, devices can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers.

While the application 220 and the other various components of service 214 are shown as residing outside of devices such as first device 252 and second device 262, in other embodiments some or all modules and components described herein can reside locally on a user device and/or a local financial network. In some embodiments, some or all components of service 214 may be stored at and executed by multiple computing systems, while in another embodiment, these components may be accessed via one or more web-based applications accessed and executed via the bank network and/or a network connection. It should further be understood that the architecture 210 as presented is for purposes of illustration only, and other embodiments may utilize different or additional processes and steps, a different ordering of these steps, or omit one or more steps shown.

Although the exemplary architecture depicts communication with a delegate over SMS, in other embodiments any other messaging system could be used. For example, communication could be mediated through various proprietary messaging systems offered by various companies, including many popular social media messaging systems. As another example, communication could be mediated through various kinds of open source messaging systems.

Figure 3:
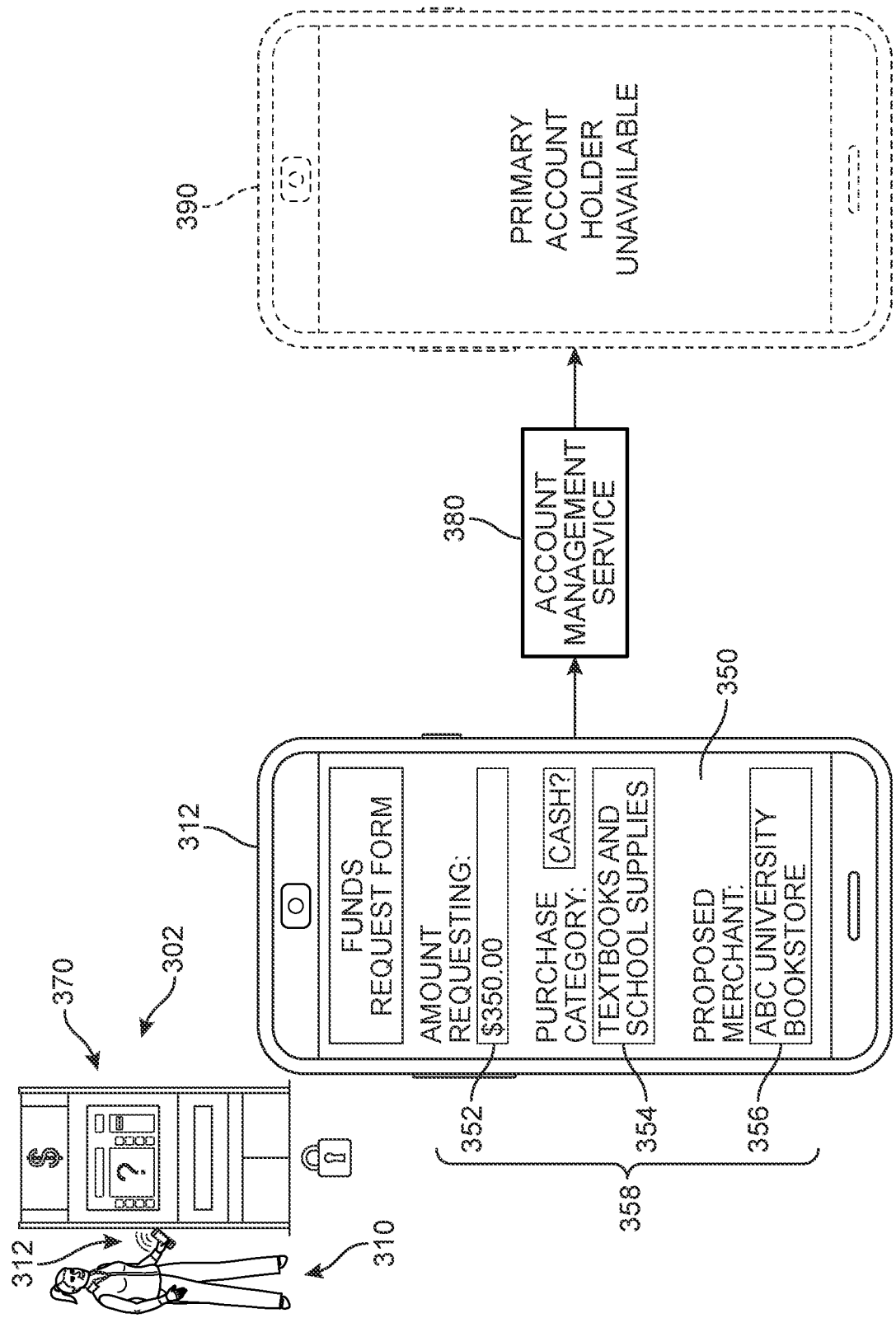
FIG. 3 is a schematic view of a step in a process for requesting approval to remove funds from a shared account, according to an embodiment.

FIG. 3 is a schematic view of a scenario in which a user 310 wants to withdrawal funds to purchase school supplies. User 310 may be a secondary account holder. In this example, an application for an access management service is configured to receive input(s) 358 from a first user 310 via a request form interface 350. Interface 350 is being accessed through a funds management application running on a computing device ("first device") 312. These inputs 358 include a first input 352 ("$350") under a first input category "Amount Requesting", a second input 354 ("Textbooks and School Supplies") under a second input category ("Purchase category"), and a third input 356 ("ABC University Bookstore") under a third input category ("Proposed Merchant"). The inputs have been entered by the first user 310 into fields that are provided by the request form interface 350. In addition, in this example, the first user 310 is at a first location 302 and desires that the transaction be in the form of a cash withdrawal from an ATM (automated teller machine) 370.

Although the embodiments depict a user requesting to withdrawal cash from an ATM, in other embodiments an approval request could be made for any other kind of financial transaction at a bank and/or merchant. For example, the user could request to purchase a particular item at a particular merchant using a card associated with the shared financial account. In some embodiments, the request form interface 350 can include selectable transaction type options for specifying whether the funds being requested are to be accessed in cash or through a merchant purchase such as via a debit or credit card.

Once the required inputs have been entered, the first user 310 can submit the request, which will be handled by a cloud-based secure account management service ("service") 380 configured to deliver the request to the appropriate account administrator. In this example, the first user 310 (a dependent daughter) has submitted a request that the system determines must be approved. As seen in FIG. 3, the primary account holder (represented schematically by device 390) is currently unavailable to approve any financial transactions.

Figure 4:
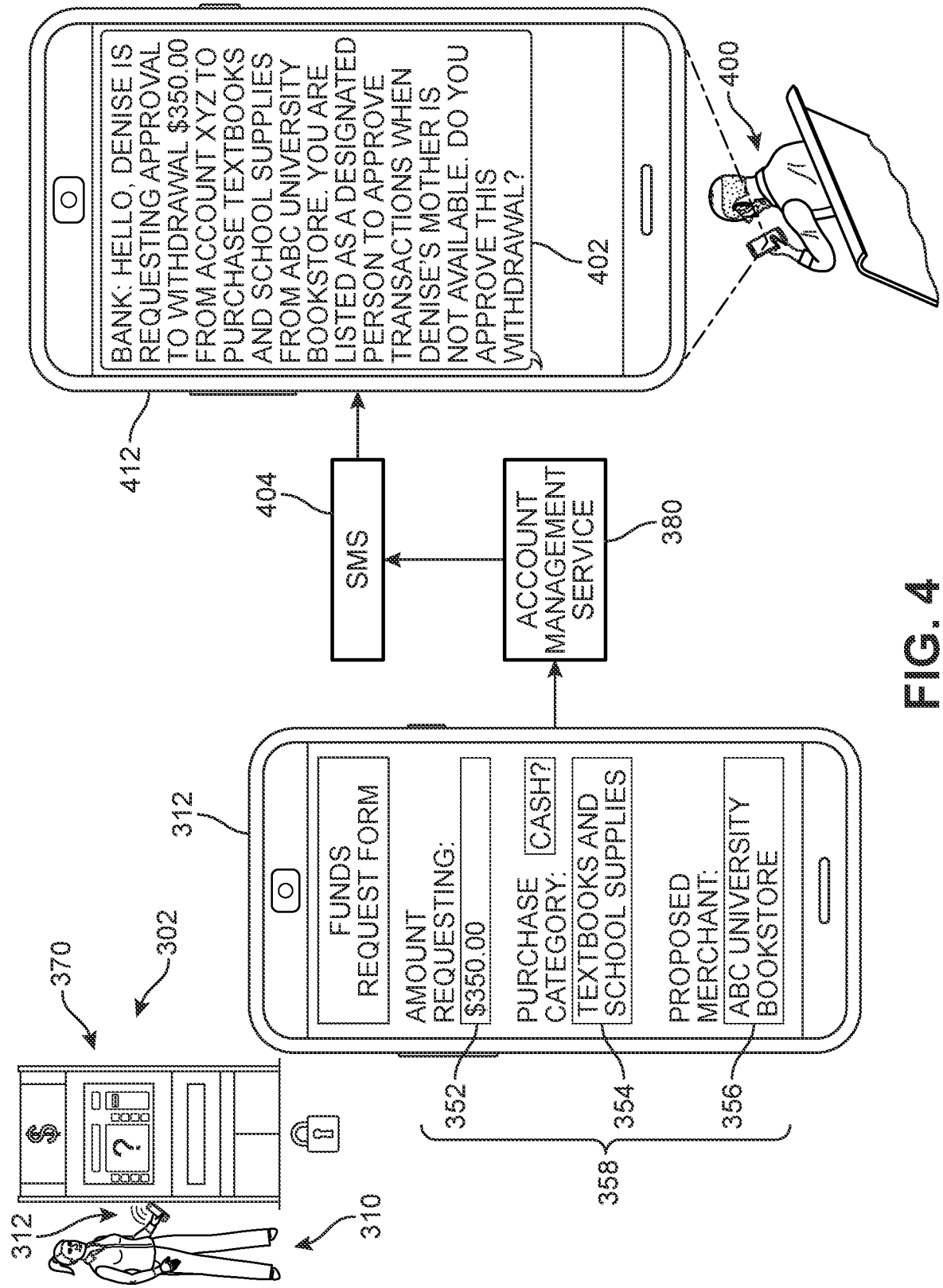
FIG. 4 is a schematic view of another step in a process for requesting approval to remove funds from a shared account, according to an embodiment.

In this scenario, the platform makes the decision to route the approval request to another person who has been delegated to approve transactions when the primary account holder is unavailable. Specifically, as shown in FIG. 4, account management service 380 passes a fund approval request to delegate 400. The fund approval request is provided as a text message 402 on the delegate's device 412, which is delivered using SMS 404.

As shown in FIG. 4, text message 402 is seen to include various information that was entered into form interface 350 by user 310, as well as other information already known to service 380. Specifically, the text message includes the name of the requesting user ("Denise"), the transaction type ("withdrawal"), the transaction amount ("$350.00"), and the account name ("XYZ"). The message also includes the items to be purchased ("textbooks and school supplies") and the where the items will be purchased ("ABC University Bookstore"). As described in further detail below, in processing the approval request, a delegate communication module (for example, module 280) converts the form information received from the user's banking application into a text-based message that can be sent using SMS 404.

Figure 5:
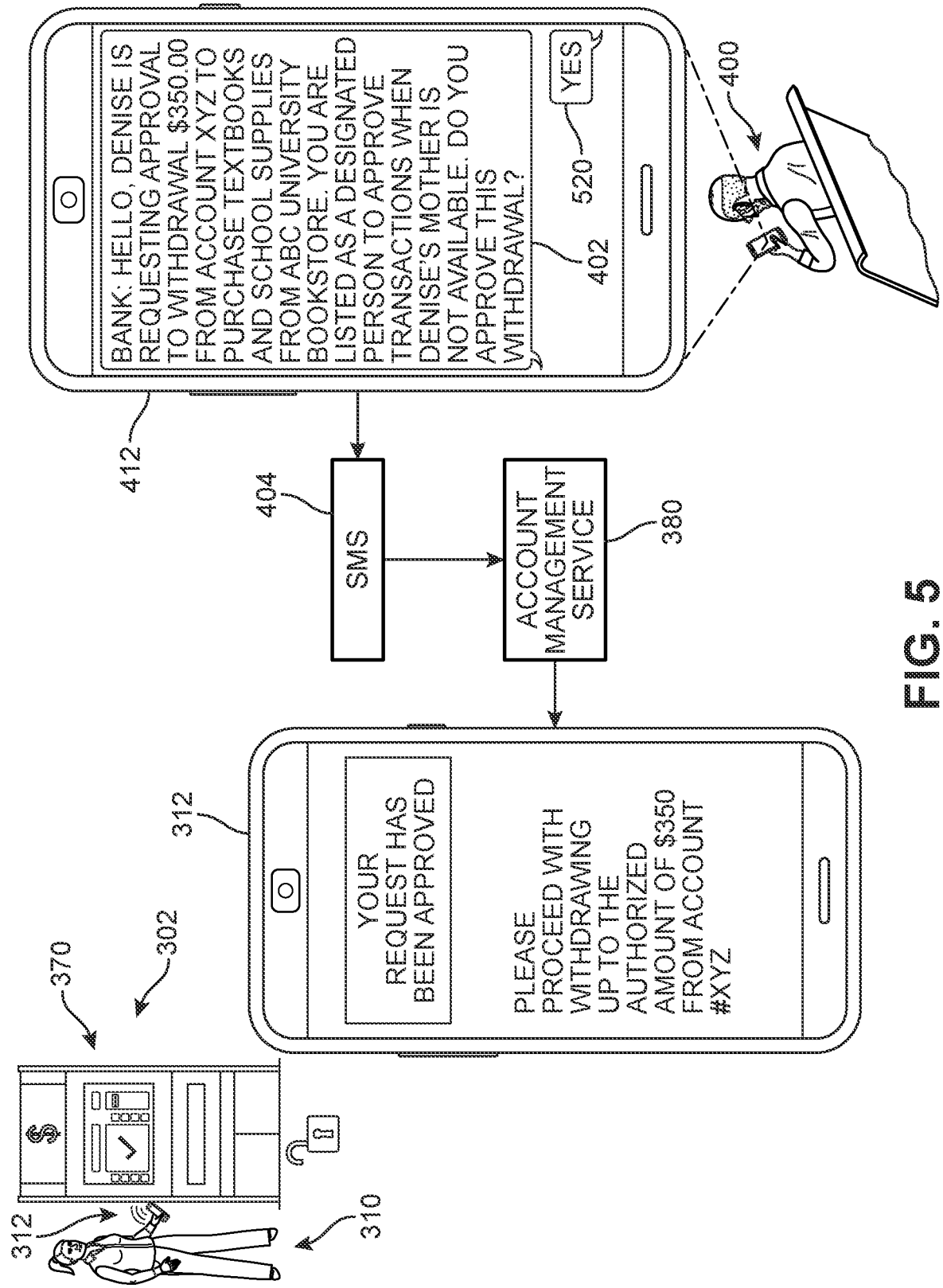
FIG. 5 is a schematic view of a step in a process for approving a request to remove funds from a shared account, according to an embodiment.

In some cases, as shown in FIG. 5, delegate 400 can simply reply "Yes" (text message 520) to the received text message 402 in order to provide approval. This response is then passed back to service 380 over SMS 404. Service 380 can then inform user 310 that the request has been approved via messages shown on device 312. At the same time as service 380 alerts user 310 that the request has been approved, service 380 communicates with the appropriate financial institution to ensure the funds are made available to user 310, as shown schematically in FIG. 5.

Figure 6:
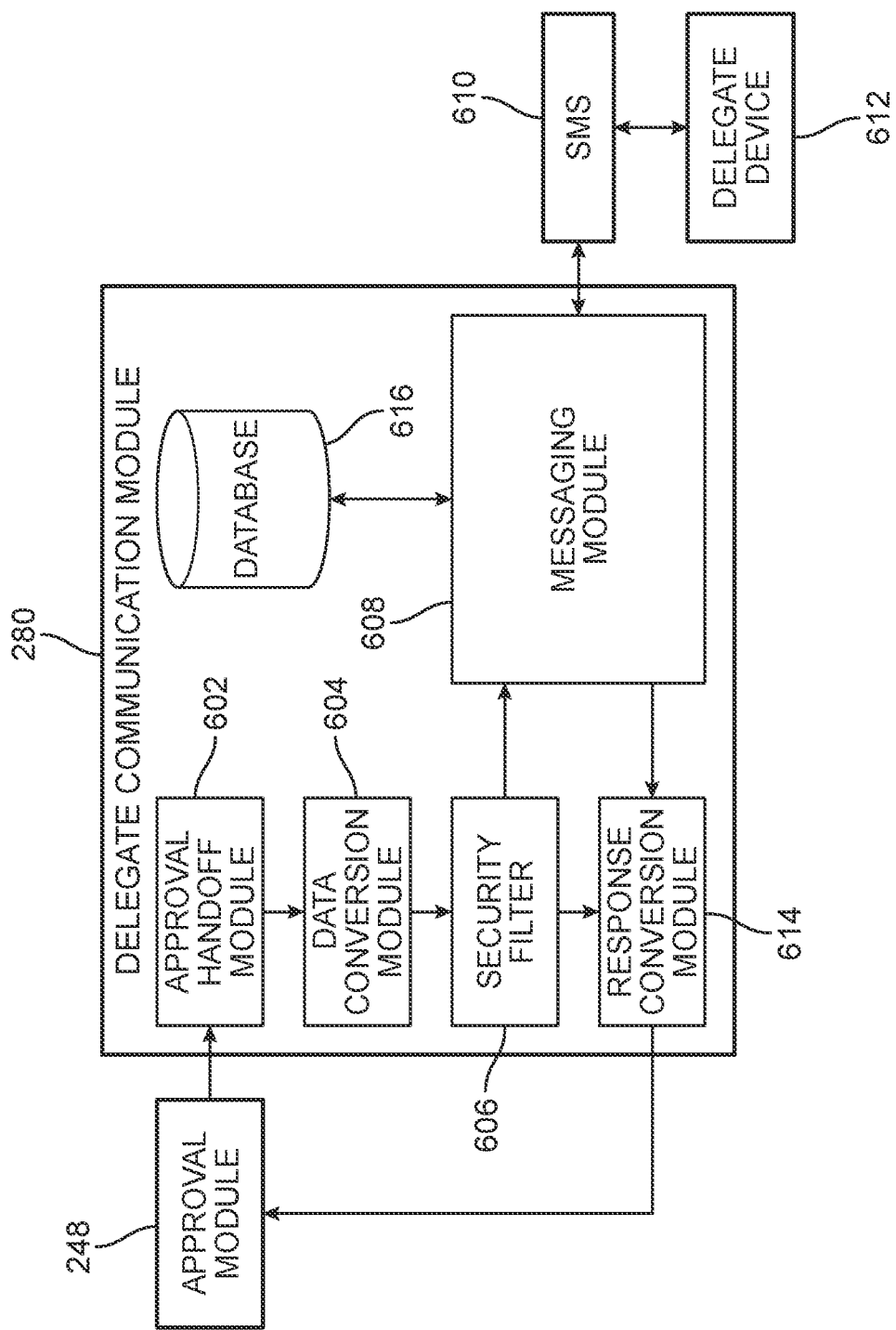
FIG. 6 is a schematic view of a delegate communication module, according to an embodiment.

FIG. 6 depicts a schematic view of one exemplary architecture for a delegate communication module 600, also referred to simply as module 600. Module 600 may include an approval handoff module 602 that takes approval requests from approval module 248. In some cases, approval module 248 may make decisions about whether a primary account holder is available to approve a fund request. If the primary account holder is unavailable, approval module 248 sends the approval request to approval handoff module 602. The approval request may include data in a structured format, such as an object or array storing both form elements and form values. In order to parse this information for communication over SMS, module 600 may include a data conversion module 604 that converts structured data into a text-only format. Generally, conversion module 604 may convert the information originally stored in any data format into a string data format that is suitable for SMS.

Some embodiments of module 600 may further include a security filter 606. Security filter 606 may be configured to ensure that no sensitive information is passed to a delegate via SMS. Examples of sensitive information could include bank account numbers, bank account balances, and various kinds of personally identifiable information associated with an account that could be used to compromise the user's account.

The filtered text-based data may then pass from security filter 606 to messaging module 608. Messaging module 608 may include any necessary functionality for generating a text message, retrieving contact information for a selected delegate, and sending and receiving text messages to delegate device 612 over SMS 610. In some cases, contact information for a selected delegate may be retrieved from a database 616. Contact information could include a phone number, an email address, and/or other identifying information (such as a username) that could be used to reach a delegate over an SMS or any other known messaging system.

Upon receiving a response from a delegate, messaging module 608 may pass the response to response conversion module 614. Response conversion module 614 parses the text-based response and determines whether the message indicates that the request has been approved or denied. The approval status is then passed back to approval module 248, which coordinates releasing funds with the associated financial institution, as described above.

Figure 7:
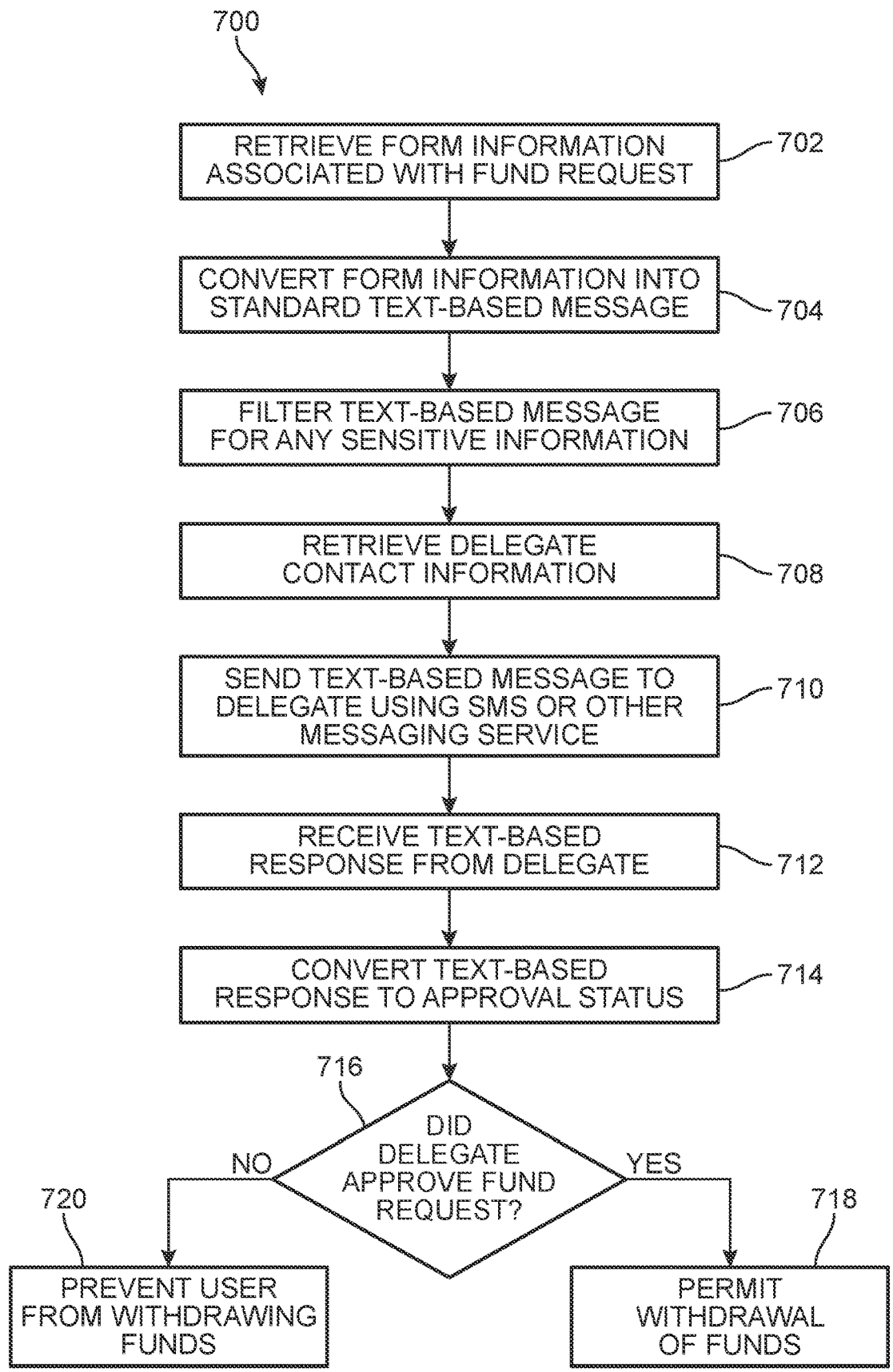
FIG. 7 is a schematic view of a process for determining if an account holder can remove funds based on approval from a delegate, according to an embodiment.

FIG. 7 provides an exemplary process 700 for approving a fund request using a delegate. In some cases, one or more of the following steps could be accomplished by an account management service (such as service 214 of FIG. 2).

Starting in step 702, service 214 may retrieve form information associated with a fund request. As described above, this information may be received from a user device and transferred over a communication channel between an application running on the user's device and a module of service 214. Next, in step 704, service 214 may convert the form information into a standard text-based message that is suitable for delivery over an SMS or other messaging network. In step 706, any sensitive information that is not suitable for communication to a delegate and/or for sending over an SMS network is filtered out.

In step 708, service 214 retrieves delegate contact information, such as a phone number or email that may be used for SMS delivery. In step 710, service 214 sends a text-based message to the delegate using SMS or another messaging service. In step 712, service 214 receives a text-based response from the delegate and converts that response to an appropriate approval status in step 714.

In step 716, service 214 determines if the fund request has been approved based on the status determined in step 714. If so, service 214 permits the withdrawal of funds in step 718. Otherwise, service 214 prevents the user from withdrawing funds in step 720.

Figure 8:
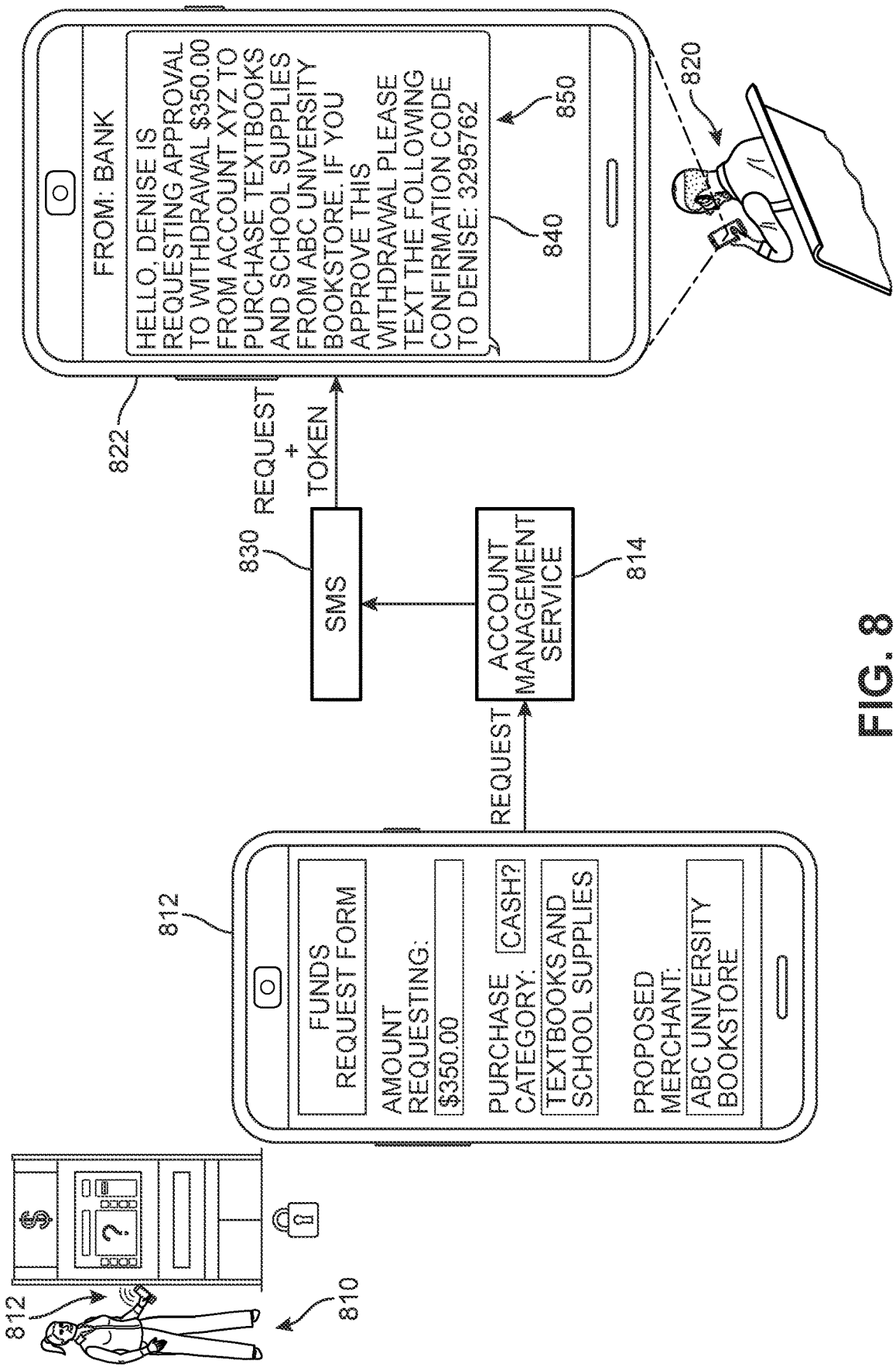
FIG. 8 is a schematic view of a step in a process for requesting approval to remove funds from a shared account that includes sending an authorization token to a delegate, according to an embodiment.

FIGS. 8-11 illustrate schematic views of an alternate configuration for having delegates approve fund requests and/or other financial transactions. In the exemplary configuration, a delegate is provided with an authorization code or token that can then be provided directly to the requesting user. This process begins in FIG. 8 where user 810 has submitted a request to withdrawal funds through an application running on device 812. The fund request is sent to account management service 814. Service 814 generates a text-based fund approval request and an authorization token, which are sent to a delegate 820 in a text-based message 840 over SMS 830. Message 840 is displayed on delegate device 822. As seen in FIG. 8, message 840 includes authorization token 850.

Figure 9:
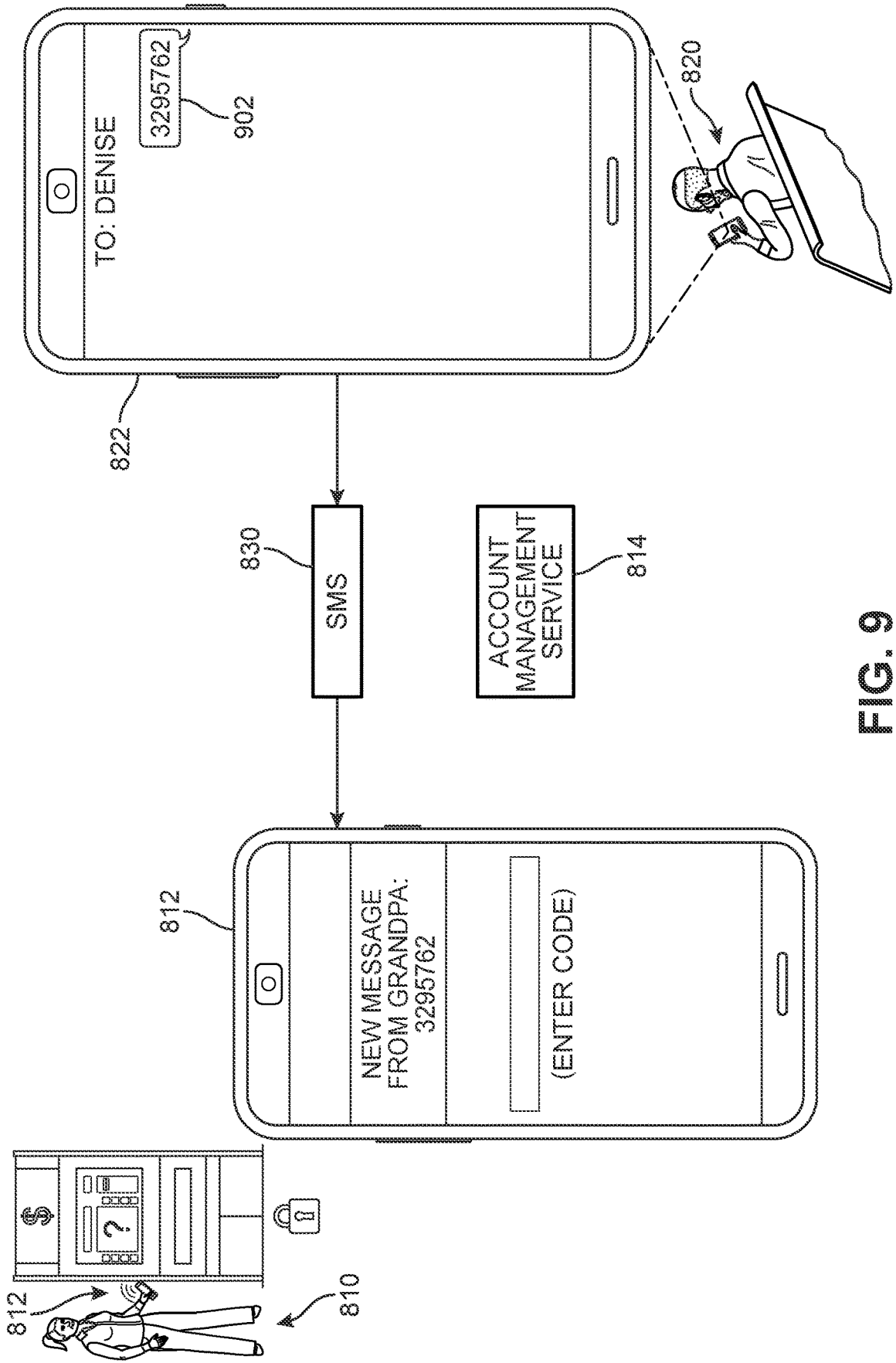
FIG. 9 is a schematic view of a step in a process of providing an authorization token to an account holder, according to an embodiment.
Figure 10:
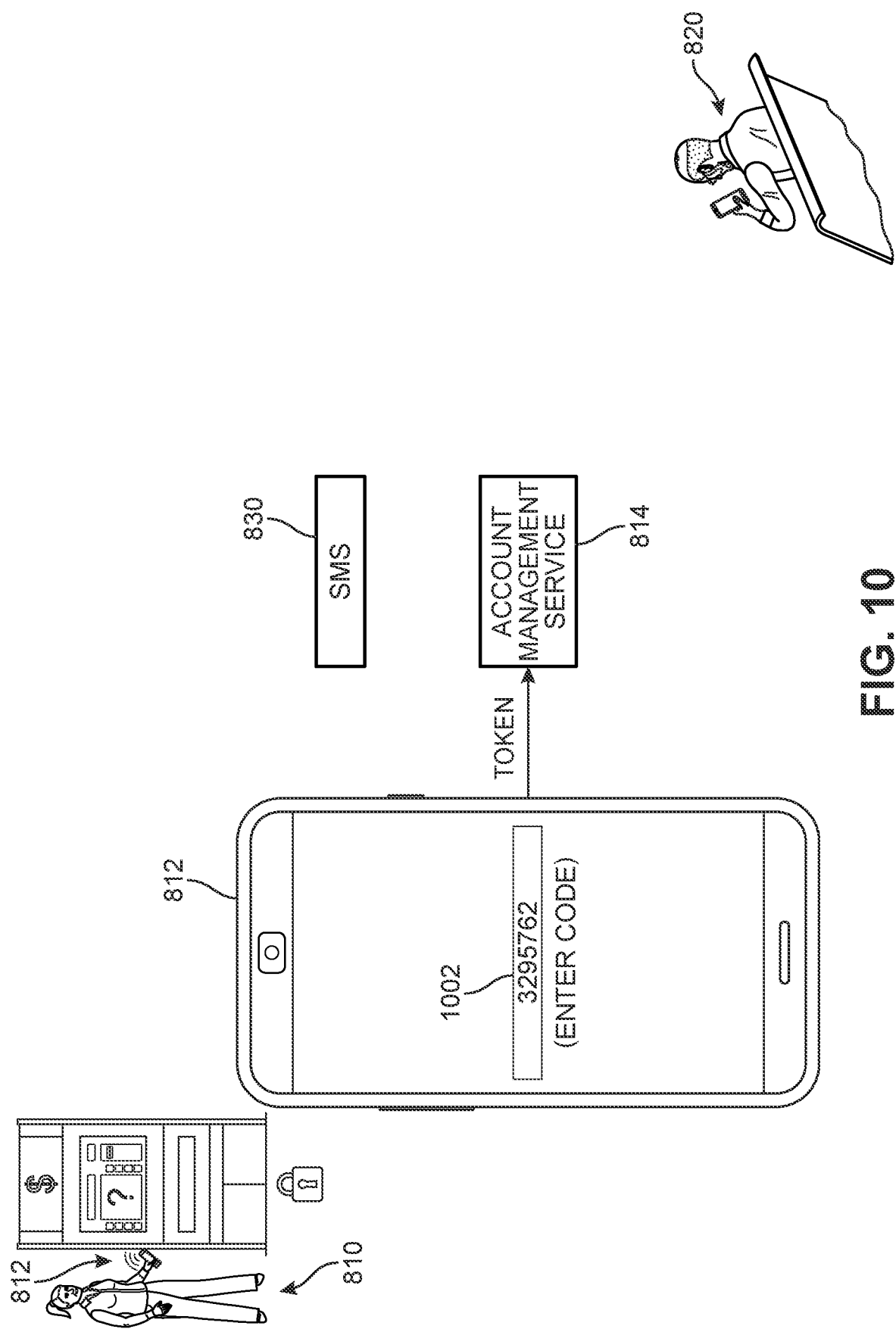
FIG. 10 is a schematic view of a step in a process of providing the authorization token to an account management service, according to an embodiment.
Figure 11:
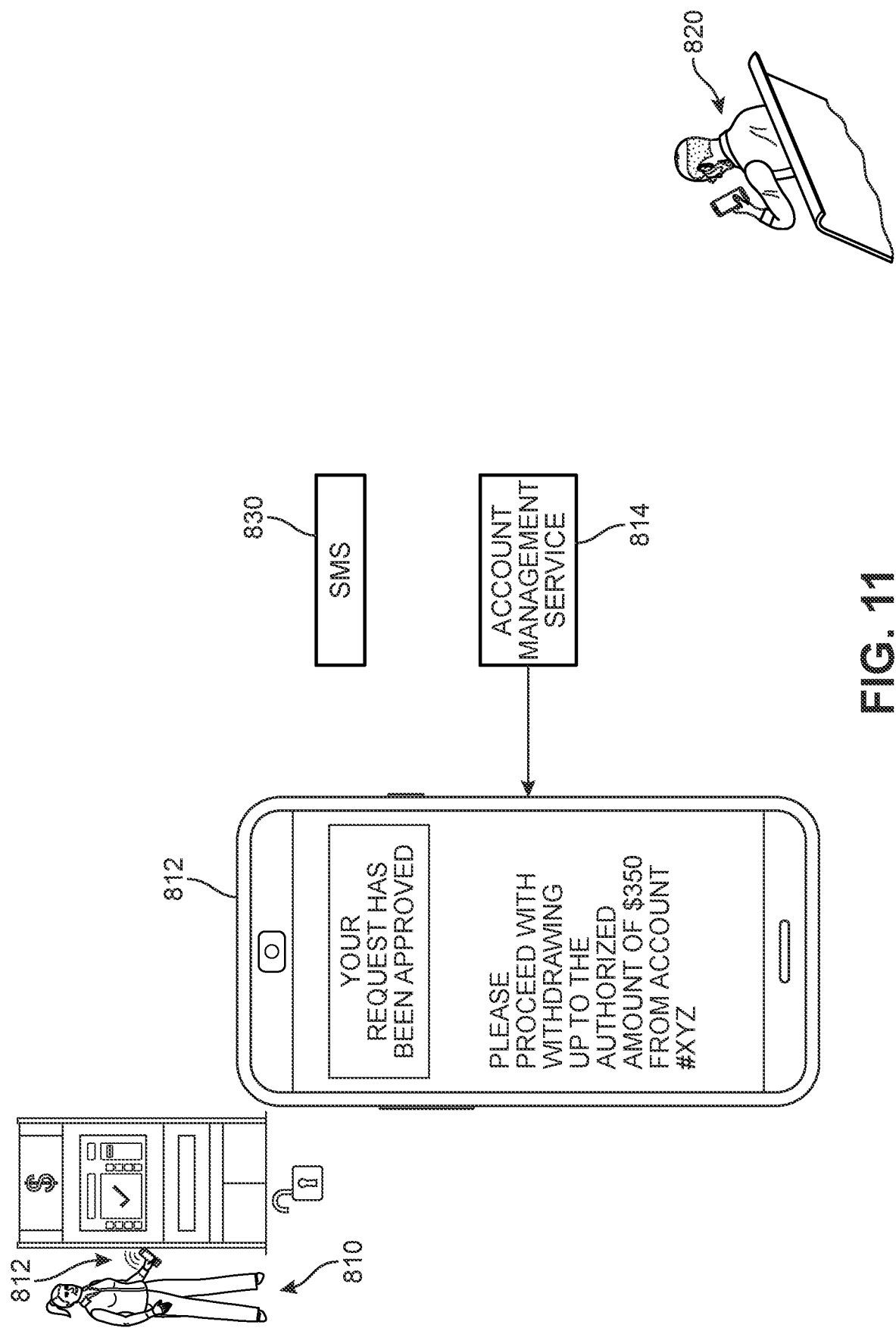
FIG. 11 is a schematic view of a step in a process of notifying a user that a request to withdrawal funds has been approved, according to an embodiment.

In FIG. 9, delegate 820 sends a new text message 902 to user 810 over SMS 830. Message 902 includes the authorization token ("3295762") that was sent to the delegate by service 814. As seen in FIG. 9, the message is received at user device 812. In FIG. 10, user enters the token (code) into form field 1002 of the banking application. The application then relays the token to service 814. Upon receiving the authorization token, service 814 informs user 810 that the fund request has been approved, as shown in FIG. 11.

The exemplary process described above and shown in FIGS. 8-11 allows for one-way communication from account management service 814 to a delegate in the form of a text message. Because the authorization token is sent directly to the user, no communication is ever received directly from the delegate, thereby improving security of the system. Instead, authorization is provided when the user communicates the token securely via the secure connection with the account management service.

Figure 12:
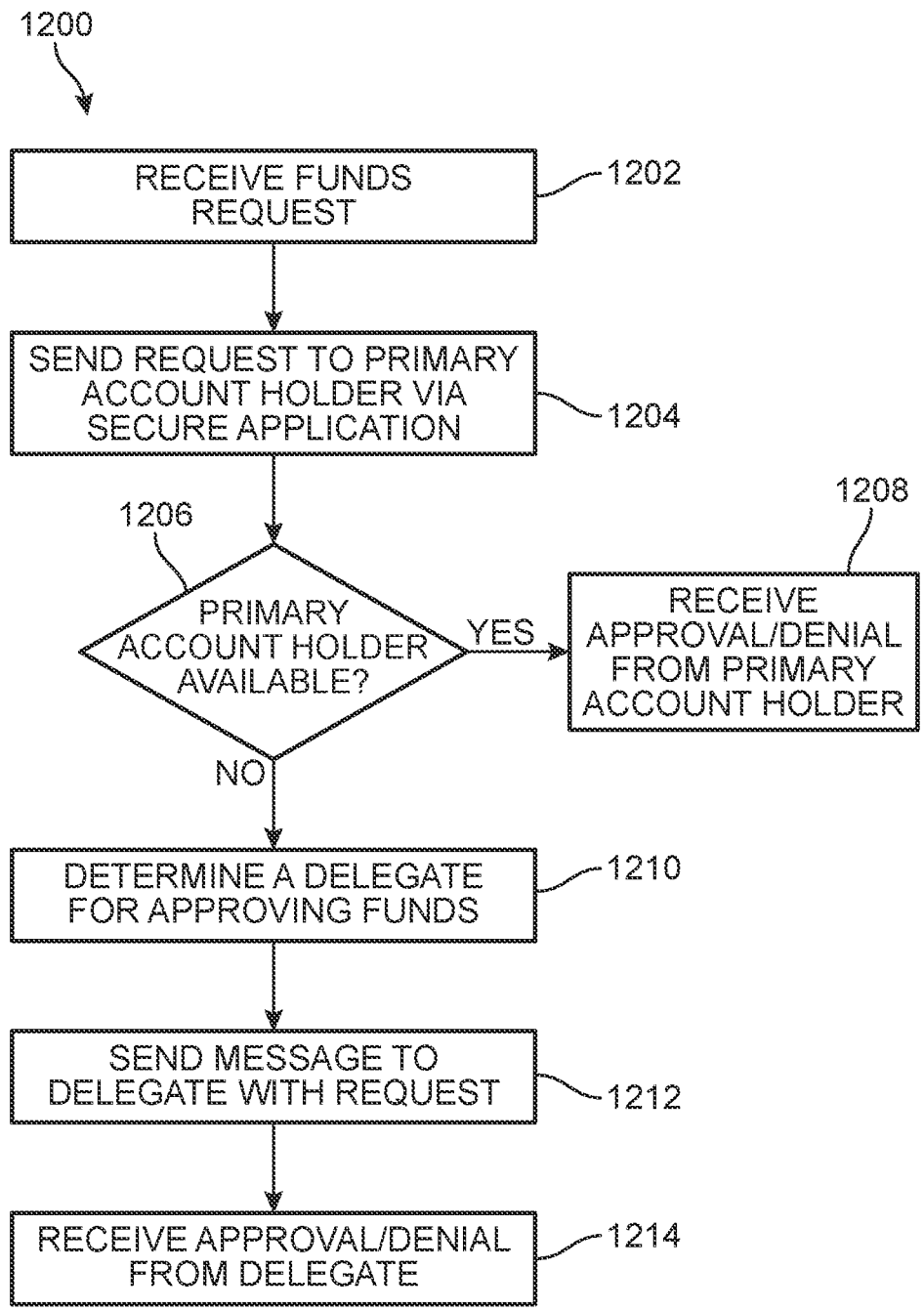
FIG. 12 is a schematic view of a process in which a system routes a funds request according to the availability of the primary account holder, according to an embodiment.

FIG. 12 is a schematic view of a process in which a system routes a funds request according to the availability of the primary account holder. Referring to FIG. 12, an account management service (such as account management service 214) may receive a funds request from a secondary account holder in step 1202 of process 1200. This request could be received, for example, from the secondary account holder's second secure banking application (such as second secure banking application 263). In step 1204, the account management service may send the request to the primary account holder via the secure banking application.

In some cases, the primary account holder may not be available to review and respond to the request sent in step 1204. If the primary account holder is available in step 1206, then the account management service proceeds to step 1208 to receive the approval or denial from the primary account holder, via the same secure banking application.

If the primary account holder is unavailable in step 1206, the account management service may proceed to step 1210 to determine a third party delegate who can approve funds. In step 1212, the account management service may send a message to the delegate with the funds request. In step 1214, the account management service may receive an approval or denial of the request from the delegate.

It is generally preferable to have all fund requests approved by a primary account holder, since the account is at least jointly owned/managed by the primary account holder. Furthermore, all fund request messages and approvals are more secure when made via the secured banking applications used by both the requesting party and the primary account holder. However, as already discussed, the primary account holder may not always be immediately available to approve fund requests. Therefore, the embodiments may be configured to automatically identify when a primary account holder may be unavailable to respond in a timely manner to a funds request.

Figure 13:
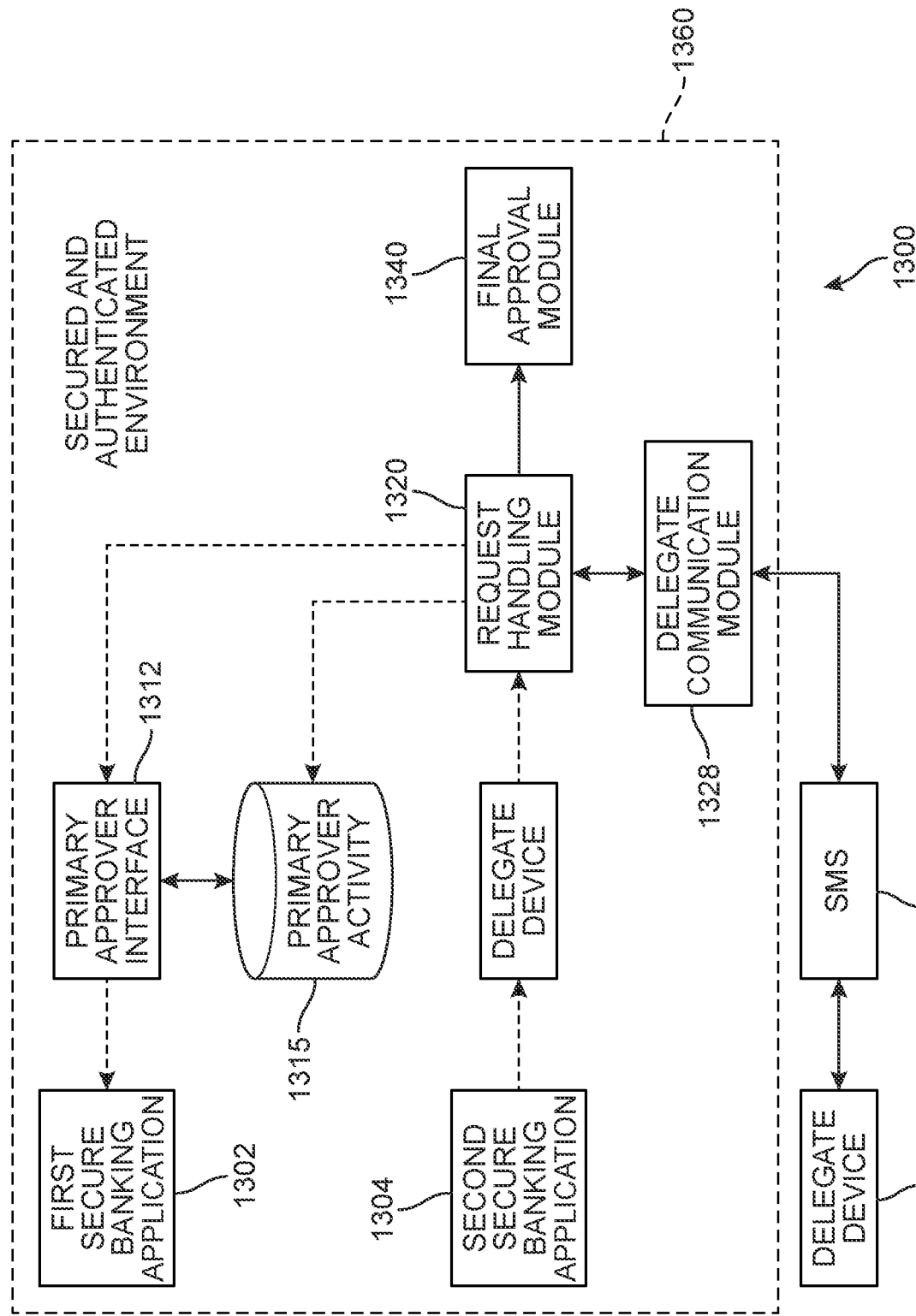
FIG. 13 is a schematic view of some components of an architecture for facilitating fund requests, according to an embodiment.

FIG. 13 is a schematic view of some components of an architecture 1300 for facilitating fund requests, according to an embodiment. Architecture 1300 includes applications and/or devices for interfacing with users, as well as some components of an associated account management service. It may be appreciated that some of the components shown in FIG. 13 and described below could be substantially similar, or otherwise include features of related components that have been described above with respect to the architecture shown in FIG. 2.

As seen in FIG. 13, users interact with components of a system using applications and/or devices. These include a first secure banking application 1302 (used, for example, by a primary account holder), a second secure banking application 1304 (used for example by a secondary account holder), and a delegate device 1306 (used by a designated delegate who can approve fund requests from the secondary account holder when the first account holder is unavailable). These components may comprise, or be substantially similar to, first secure banking application 253, second secure banking application 263, and third device 272, of the system shown in FIG. 2.

First secure banking application 1302 interfaces with an account management service through primary approver interface 1312 (which may be substantially similar to requester interface 242). The account management service could be similar to, and/or share features of, account management service 214. Second secure banking application 1304 interfaces with the account management service through requester interface 1314. Delegate device 1306 interfaces with the account management service using SMS 1326, and through a delegate communication module 1328 (which may be substantially similar to delegate communication module 280).

A request handling module 1320 receives requests generated by requester interface 1314. Request handling module 1320 is configured to make determinations about the availability of the primary account holder, and to communicate requests to both the primary account holder (via first secure banking application 1302) and/or the designated delegate (via delegate device 1306). Request handling module may share some features with request processor 244.

Once a request has been either approved or denied, information may be passed to final approval module 1340 (which may be substantially similar to approval module 248) to take appropriate actions for permitting to denying the funds to the requesting party.

For purposes of clarity, FIG. 13 depicts two possible routes for requests based on primary account holder availability. A first route 1350 (indicated with dashed lines) occurs entirely within the account management service, and involves passing messages from request handling module 1320 to primary approver interface 1312. A second route 1352 (indicated using solid lines) includes passing messages from request handling module 1320 to delegate communication module 1328, which then communicates with delegate device 1306 over non-authorized channels (for example, using SMS).

It may be appreciated that requests processed through first route 1350 occur entirely within a secured and authenticated environment 1360. That is, all communication may occur via authenticated and secure channels, including communication between components of the account management service and devices used by the primary and secondary account holders. These communications may not only occur along authenticated channels, but they also may be encrypted to ensure security and privacy. By contrast, requests processed through second route 1352 must necessarily leave the secure and authenticated environment 1360. As discussed, the exemplary system includes many provisions to ensure that privacy is maintained and secure information does not leave the secured and authenticated environment 1360.

In some cases, to make determinations about the primary account holder's availability, queries may also be made to resources that track the primary approver's activity on the secure banking application and/or on a user device (such as a phone). In some cases, activity logs may be created and managed by primary approver interface 1312. In particular, the primary account holder's activity on first secure banking application 1302 may be tracked and stored within a database 1315. This history of activity may then be queried to determine if the primary account holder is currently active, recently active, and/or the specific date and time when they last used the first secure banking application. In some cases, rather than recording activity logs, the primary account holder's activity status may be stored, for example, in database 1315. In some cases, a system may track the status as 'active' or 'inactive'. In other cases, the system may track the status as 'currently active', 'recently active', and/or a time/duration since the account holder was last active.

Figure 14:
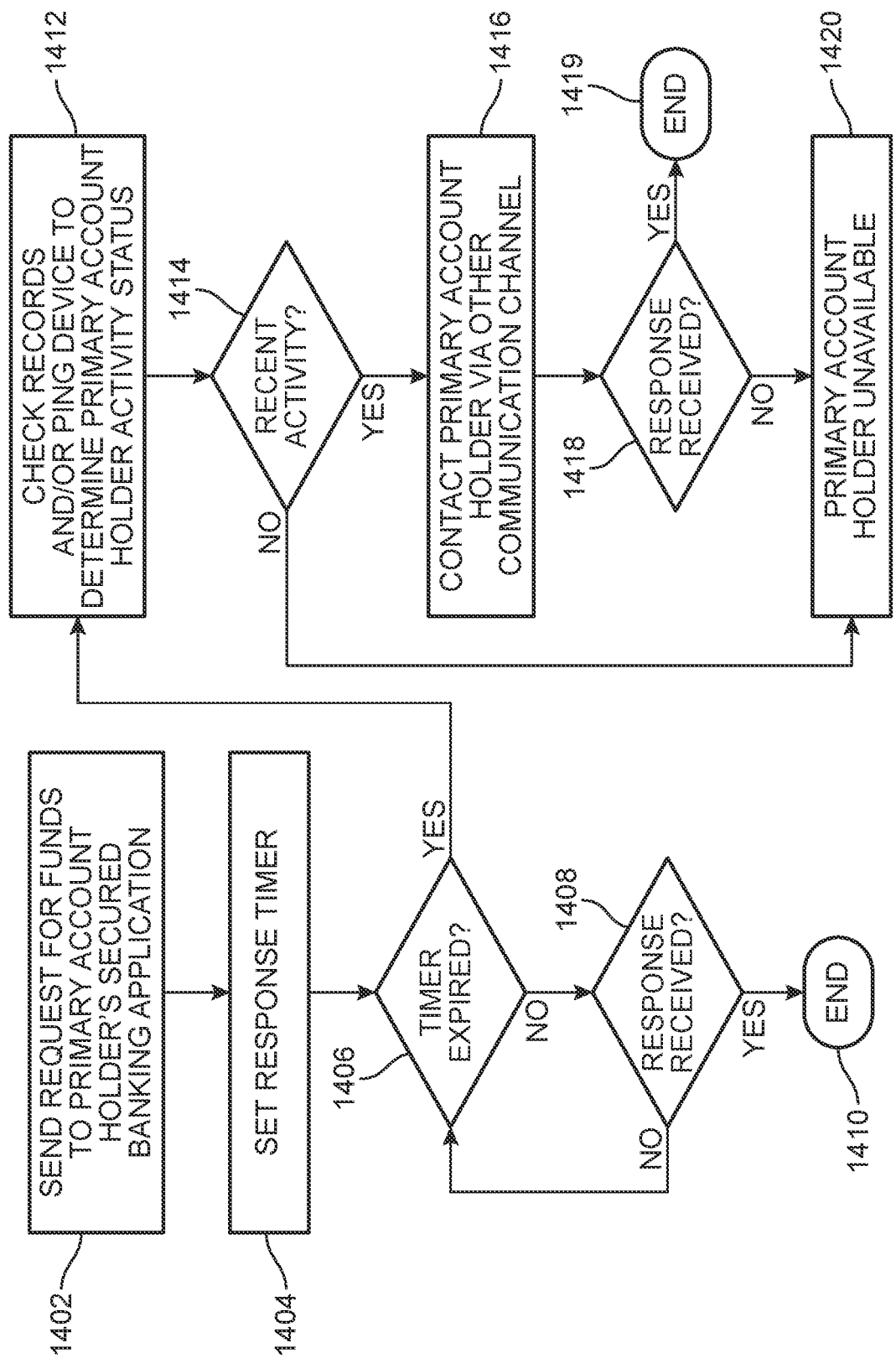
FIG. 14 is a schematic view of a process for determining when a primary account holder may be unavailable to respond to a funds request, according to an embodiment.

FIG. 14 is a schematic view of a process for determining when a primary account holder may be unavailable to respond to a funds request. The following steps may be performed by one or more components, systems or modules associated with an account management service. In some embodiments, one or more of these steps could be accomplished by a request handling module.

In step 1402, a request handling module may, upon receiving a funds request, send the funds request to the primary account holder's secured banking application. In order to ensure that a timely response to the request is provided, and to determine if a delegate should be contacted instead, the process includes further steps to determine if a primary account holder may be unavailable to respond to the request.

In step 1404, the request handling module may set a response timer. The response timer may be set for any suitable amount of time. As an example, the response timer may be set for five minutes. In other case, the response timer may be set for fewer than five minutes or for longer than five minutes.

Next, in step 1406, the request handling module checks to see if the timer has expired. If not, the request handling module 1408 checks for a response. If a response is received, there is no need to continue the process and it ends in step 1410. If no response is received, the request handling module returns to step 1406 to see if the timer has expired.

When the time expires, the request handling module proceeds from step 1406 to step 1412. At this point, rather than automatically proceeding to contact a delegate with the request, the request handling module takes additional steps to make certain that the primary account holder is unavailable to manage the request before sending the request to a delegate outside the secure and authenticated environment.

In step 1412, the request handling module may check records for user activity on the secured banking application and/or ping the primary account holder's device to determine if they have recently been active on the device. In some cases, the request handling module checks logs that may include a record of all the primary account holder's activities on the secured banking application. For example, if the primary account holder checks his or her account balance at a given time, the date, time, and activity may be recorded in the logs. In some cases, the request handling module may check an 'activity status' that is tracked by the system and stored in memory. In some cases, the request handling module may check to see if the primary account holder has been active on their device. The activity device may not be stored locally, due to availability of the data and/or privacy issues. In some cases, to obtain device activity information, the account management service may send requests to the device using a suitable API.

In step 1414, the request handling module determines if the primary account holder has been recently active on the secured banking application and/or their device (for example, a phone). If there is no recent activity and the response timer has expired, the request handling module may proceed to step 1420 where it is determined that the primary account holder is unavailable.

If, however, there has been recent activity, indicating that the primary account holder may be available to respond to the request, the request handling module may attempt to contact the primary account holder through other channels in step 1416. These can include text, email, and/or phone calls. For example, the system may send a text and/or email alerting the primary account holder that a funds request is ready for their review within the secured banking application. In some cases, the request handling module may initiate an automated call to the primary account holder.

In step 1418, the request handling module checks again to see if the primary account holder has responded to the funds request, possibly having been prompted by any communications initiated in step 1416. If no response has been received after a predetermined time (or predetermined period), the request handling module may determine that the primary account holder is unavailable in step 1420. If a response has been received, the request handling module can proceed to step 1419, where the process ends.

Figure 15:
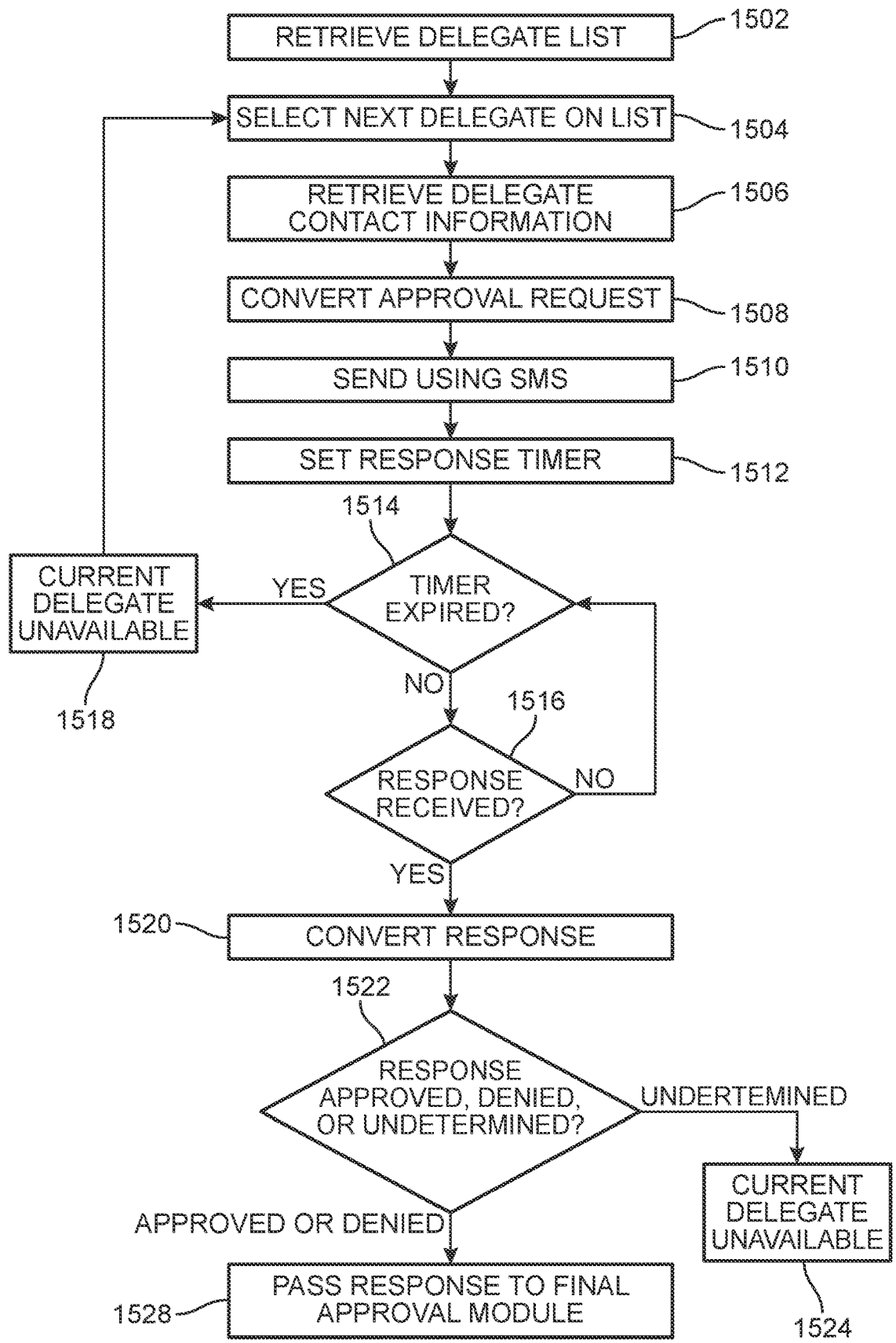
FIG. 15 is a schematic view of a process for identifying an available delegate and sending a funds request to the available delegate, according to an embodiment.

FIG. 15 is a schematic view of a process for identifying an available delegate and sending a funds request to the available delegate. In some cases, one or more of these steps could be performed by one or more modules, components, or systems within delegate communication module 1328 (see FIG. 13).

Starting with step 1502, the delegate communication module may retrieve a delegate list from memory. This list can include delegates who have been designated by the primary account holder, along with one or more forms of contact information (such as a phone number and an email address).

In step 1504, the delegate communicate module selects the next (or first) delegate on the list. Next, in step 1506, the delegate communicate module retrieves contact information for the delegate. In step 1508, the delegate communication module converts the approval request into a format that can be sent via non-secured channels, such as SMS. This conversion process may further comprise multiple steps, as discussed in further detail below and shown in FIG. 16.

In step 1510, the delegate communication module may send the request via SMS or other suitable messaging service. In step 1512, the delegate communication module may set a response timer. In step 1514, the delegate communication module may check to see if the timer has expired. If so, the delegate communication module determines that the currently selected delegate is unavailable in step 1518. At this point, the module may return to step 1504 to select the next delegate on the list. This can be repeated until a delegate is found who is available, or until there are no more delegates to select.

In the timer has not expired in step 1514, the delegate communication module may check to see if a response has been received from the delegate device in step 1516. If not, the delegate communicate module returns to step 1514. Otherwise, if a response is received, the delegate communication module proceeds to step 1520.

Because the delegate may respond using SMS or other simple text-based messaging services, there is no a priori constraint on the responses received from the delegate. A delegate could respond "YES", "NO", "I APPROVE", "I DO NOT APPROVE", which may be easy for the system to recognize. But the delegate could also respond with more ambiguous texts such as "OK" or "SOUNDS GOOD" or using an emoticon or emoji (such as a "thumbs up" emoji). It is even conceivable that the delegate could respond with words that have no connection at all to the request, including gibberish or random letters/numbers. Because of the unconstrained nature of the possible text-based responses, the system may be configured to convert the response into an "approval" or "denial" that can be used for further actions by downstream systems to allow the requester to make purchase, withdrawal funds, or to block these actions. Therefore, in step 1520, the delegate communication module converts the response from the delegate into an "approval", "denial" and/or "unknown" type response. That is, the delegate communication module automatically classifies the response into of one these categories (approved, denied, unknown/undetermined).

In step 1522, the delegate communication module may determine if the response has been classified as approved, denied, and/or undetermined. In other words, the delegate communication module checks that the response makes sense and is one of a predetermined response type (for example, one of either "approved" or "denied"), before passing the response to the final approval module. Classification may include comparison with a list of accepted/known phrases or responses indicating approval and/or accepted/known phrases or response indicating denial. Other responses not matching or similar to the accepted/known phrases or responses may be categorized as unknown/undetermined. Further details about the process of classifying a response are described in further detail below, and may include, for example, the use of natural language processing.

If the response has been classified as undetermined, the delegate communication module may proceed to step 1524. In step 1524 the delegate communication module may send a follow-up message to have the delegate clarify his or her response. For example, the delegate communication module could send a response such as "Please respond APPROVE or DENY" or "Please response YES or NO". Even if these instructions are provided as part of the initial funds request message that has been previously sent to the delegate, the delegate may need to be reminded of an appropriate response format. In some cases, if the delegate still does not respond with in an appropriate format, the delegate communication module could return to step 1504 to select a new delegate.

If the converted response has been classified as either "approved" or "denied", the delegate communication module can pass the converted response to the final approval module in step 1528.

Figure 16:
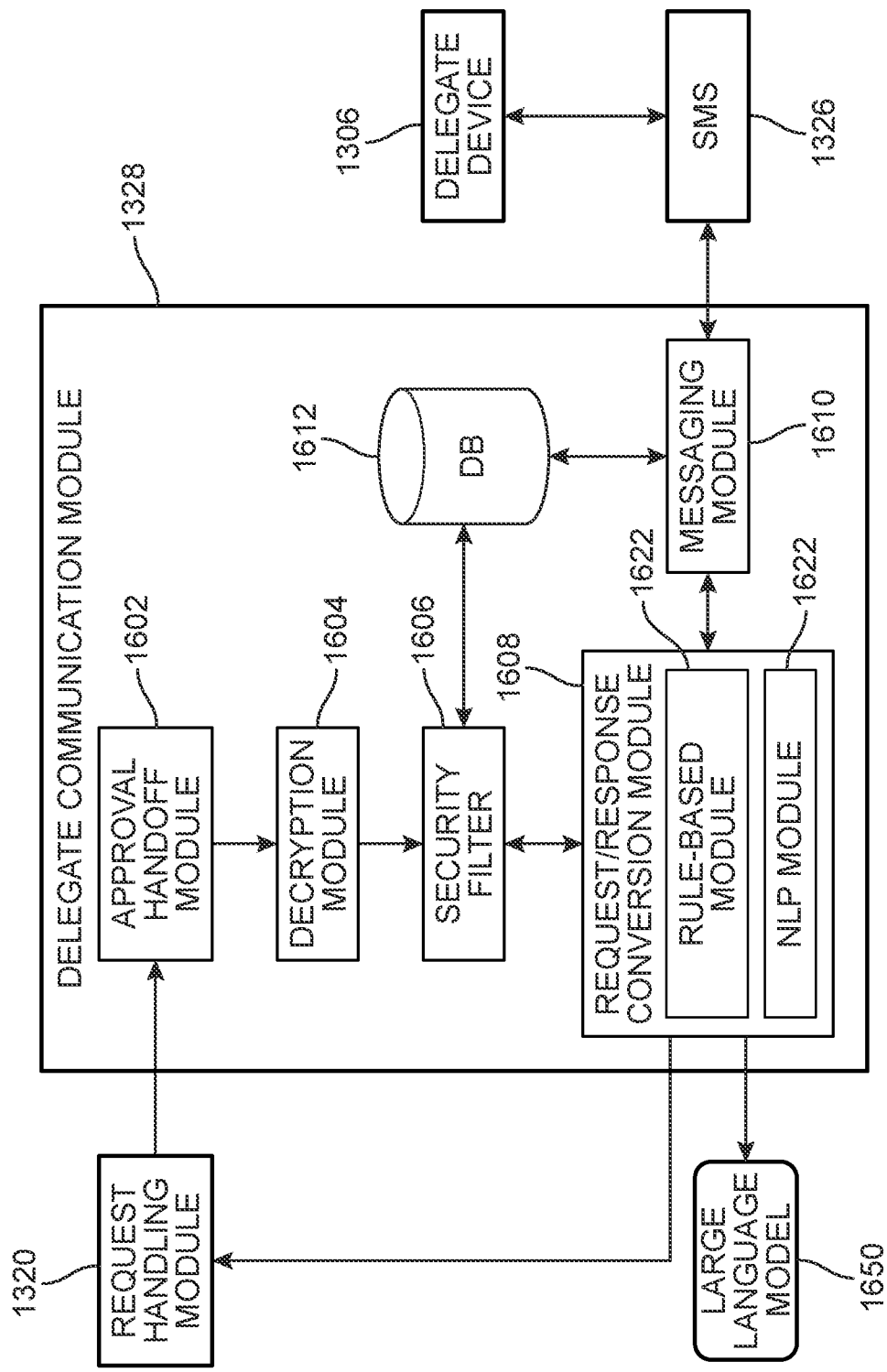
FIG. 16 is a schematic view showing some components of the delegate communication module, according to another embodiment.

FIG. 16 is a schematic view showing some components of the delegate communication module 1328, or simply module 1328, along with some of the external components it may interface with, according to another embodiment.

Module 1328 may include an approval handoff module 1602 that takes approval requests from request handling module 1320. Approval handoff module 1602 may comprise, or be substantially similar to, approval handoff module 602. For example, if request handling module 1320 receives a funds request and determines that the primary account holder is unavailable, the approval process may be handed off to approval handoff module 1602.

As already discussed, fund requests are generated within the secured and authenticated environment associated with account management service and the associated secured banking applications. The default assumption is that requests will be approved internally, using the secure and authenticated interface. Therefore, the default configuration for requests may be generated in a structured format, so that the request includes both properties (or parameters), such as "request type" and "request amount" as well as values for the properties (or parameters) for any given request. The request can also include various kinds of metadata, such as information about the requesting party, associated application, and/or the device used to make the request. Moreover, for security and data integrity, the request may be encrypted using internal encryption mechanisms that may be used for passing messages and other information within the account management service environment. Therefore, the account management service must be configured to generate a text-based request that can be sent to a delegate over non-secure and authenticated channels (such as SMS). This may be challenging as the requester interface 1314 and the request handling module 1320 may not be configured to translate encrypted and object-formatted requests to decrypted/unformatted requests that are easily intelligible to the end user (the delegate).

To accomplish this conversion, delegate communication module 1328 makes use of multiple modules or sub-modules that, together, convert the encrypted highly structured/formatted message into something that can be safely sent via SMS and which is easily understood by an end user (the delegate). Specifically, delegate communication module 1328 includes a decryption module 1604, a security filter 1606, a request/response conversion module 1608 (also referred to as a data conversion module) and a messaging module 1610. Delegate communication module 1328 may also include a database 1612 that stores delegate information (including delegate names and contact information).

Encrypted and structured requests may be converted into decrypted text-based requests as follows. Requests are passed from approval handoff module to decryption module 1604. Decryption module 1604 may decrypt entire messages/requests, or parts of a message/request when only some parts are encrypted. For example, for structured requests, the category (for example, "request type") could be unencrypted, while the value (for example, "ATM withdrawal") could be encrypted. In other cases, the entire request may be encrypted.

Once a request has been decrypted, the decrypted (or unencrypted) request may be reviewed for personally identifying information, or any other information that should otherwise be secured, such as bank account information, bank account balances, contact information, social security numbers, financial transaction information, or other information that is not suitable to be sent to delegates over SMS. In the exemplary embodiment, security filter 1606 may be used to remove private or other sensitive information.

Once the message has been decrypted and filtered, the message may be passed to conversion module 1608. Conversion module 1608 may convert the raw data from the decrypted message into a suitable text-based request. Specifically, the request may be in a natural language format that would be suitable for an end-user. As an example, a structured request may be generated with the content: "{"Request Type": "ATM Withdrawal", "Request amount: $250.00", "Requesting party": "John Doe"}. Conversion module 1608 may convert this structured request into a suitable text-based request, such as "John Doe would like to withdrawal $250.00 from the ATM. You are listed as a delegate who is able to approve such withdrawals when his father is not available. Do you approve this withdrawal?"

To facilitate converting structured data into text-based requests, the embodiments may use hard coded rules (via rule-based module 1620) and/or natural language processing techniques (via NLP module 1622). Exemplary natural language processing techniques that could be used include, but are not limited to: keyword extraction techniques, knowledge cloud techniques, text summarization techniques, sentiment analysis, bag of words techniques, and other suitable techniques.

Some embodiments could utilize advances in machine learning that leverage so-called "Large Language Models", or LLMs. LLMs are able to process input large quantities of text and generate suitable outputs. As an example, to convert the above structured request into a text-based request, conversion module 1608 could make an API call to an external LLM 1650. For example, conversion module 1608 may send an API call such as "please restate the following structured list as a request for funds to be approved or denied by another party," along with the structured request itself. LLM 1650 could automatically process the request and output a suitable text-based response such as the one provided above, which may then be passed as a message to the delegate over SMS.

Once a modified request has been generated by conversion module 1608, the request may be reviewed again for any remaining personally identifying information, or any other information that should otherwise be secured, such as bank account information, bank account balances, contact information, social security numbers, financial transaction information, or other information that is not suitable to be sent to delegates over SMS. In the exemplary embodiment, security filter 1606 may be used to remove private or other information. That is, in some embodiments, security filter 1606 is used to remove sensitive or private data from both the raw request and the modified (or converted) request.

The final decrypted, filtered, and converted request can then be passed to messaging module 1610. Messaging module 1610 can look up suitable delegate information and prepare and send the message to delegate device 1306 via SMS 1326.

When a response is received from the delegate at messaging module 1610, it may be passed back to conversion module 1608. At this point, rather that converting structured data into a suitable natural language request as before, module 1608 acts to parse responses and classify the response as either a request approval, a request denial, or an unknown/undetermined response. For this step, module 1608 could leverage sentiment-based NLP models that can convert natural language statements into suitable sentiments, where the sentiment of relevance would be the approval or denial of a funds request. In other cases, other suitable NLP classification models could be used to classify text-based responses from the delegate into one of the above categories. In some cases, conversion module 1608 could make a call to LLM 1650 to determine an appropriate classification of the response. As an example, conversion module 1608 could send a message to the LLM with both the request and the response and ask if the received response is indicative of approval or denial.

Finally, the response category (approved, denied, unknown) can be passed back to request handling module 1320 for further processing.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of facilitating communication between an account management service controlling access to a bank account and multiple devices operated by users who are authorized to approve requests for funds from the bank account, the method comprising:

establishing communication over a network between a first secured banking application running on a first device used by a first user and a requester interface of the account management service, wherein the first secured banking application communicates with the account management service using an application programming interface associated with the account management service;

generating an approval request having a first data format in response to receiving, at a request handling module of the account management service, information about a request for funds using the first device, wherein the first data format includes data structured as an object or array, and wherein the approval request is encrypted;

establishing communication over a second network between a second secured banking application running on a second device used by a second user and an approver interface of the account management service, wherein the second secured banking application communicates with the account management service using the application programming interface associated with the account management service;

determining that the second user is unavailable to respond to the approval request, by;

sending the approval request to the second secured banking application;

determining that no response to the approval request has been received within a predetermined period;

querying a database for activity by the second user on the second secured banking application and determining that there has been no activity by the second user on the second secured banking application within a second predetermined time period; and sending a message to the second user through a secondary communication channel that is different from the secured banking application in response to determining that there has been no activity by the second user within the second predetermined period, and receiving no response to the message from the second user;

sending the approval request to an approval handoff module of a delegate communication module;

converting, by the delegate communication module, the approval request having the first data format that is encrypted and readable by modules of the account management service into a second format that is interpretable by a third user of a third device by:

decrypting, with a decryption module of the delegate communication module, the approval request;

removing, with a security filter of the delegate communication module, sensitive information from the decrypted approval request;

sending the decrypted approval request having the first data format to a large language model along with a prompt to convert the decrypted approval request into a natural language output and receiving, from the large language model, a modified approval request having the second format;

retrieving contact information for the third user;

automatically sending, with a messaging module, the modified approval request in the second data format to the third device using a short messaging service;

receiving a response to the modified approval request, at the messaging module, wherein the response is a text-based response;

sending the response to the modified approval request to the large language model along with a second prompt to convert the response into an approval status in the first data format and receiving, from the large language model, the approval status in the first data format; and determining if the requested funds should be released to the first user in response to receiving the approval status in the first data format.

2. The method according to claim 1, wherein the sensitive information includes personally identifying information.

3. The method according to claim 1, wherein the second secure banking application includes authentication information to authenticate the second user with the account management service.

4. The method according to claim 1, wherein the second secured banking application is configured to receive approval requests having the first data format.

5. The method according to claim 1, wherein the contact information includes a phone number for the third user and wherein automatically sending includes automatically sending the modified approval request to the phone number.

6. The method according to claim 5, wherein receiving the response includes receiving the response from the phone number.

7. The method according to claim 1, wherein the secondary communication channel is an email.

8. The method according to claim 1, wherein the secondary communication channel is SMS.

9. The method according to claim 1, wherein the secondary communication channel is a phone call.

10. A method for allowing delegates to securely manage access to funds held in a bank account, the funds being accessible to a primary account holder of the bank account and a secondary account holder of the bank account, the method comprising:

establishing communication between a first secured banking application running on a first device used by the secondary account holder and a requester interface of an account management service, wherein the first secured banking application communicates with the account management service using an application programming interface associated with the account management service;

generating an approval request having a first data format in response to receiving, at a request handling module of the account management service, information about a request for funds using the first device, wherein the approval request is encrypted;

establishing communication between a second secured banking application running on a second device used by the primary account holder and a primary approver interface of the account management service, wherein the second secured banking application communicates with the account management service using the application programming interface associated with the account management service;

determining that the primary account holder is unavailable;

sending the approval request to an approval handoff module of a delegate communication module, the delegate communication module further comprising an encryption module, a security filter, a messaging module, and a data conversion module in communication with a large language model;

decrypting, with the decryption module, the approval request;

removing, with the security filter, sensitive information from the decrypted approval request;

sending a query to the large language model, wherein the query includes the decrypted approval request and a prompt to convert the decrypted approval request into a natural language output, and receiving a modified approval request as a string of data comprising information in a natural language format;

retrieving contact information for a delegate authorized to approve the approval request;

automatically sending, with the messaging module, the modified approval request to a third device using a short messaging service;

receiving a response to the modified approval request, at the messaging module, wherein the response is a text-based response;

sending a second query to the large language model with a second prompt to convert the response into an approval status in the first data format, wherein the second query includes the text-based response, and receiving an approval status;

determining that the modified approval request has been approved based on the approval status; and sending information to a secure account gateway controlling access to the bank account in response to determining that the request for funds has been approved, the information including instructions to release the requested funds to the secondary account holder.

11. The method according to claim 10, wherein the first data format is an object data structure.

12. The method according to claim 10, wherein the first data format is an array data structure.

13. The method according to claim 10, wherein the data conversion module can predict, based on the response from the delegate, one of three values, including a first value indicating the approval request has been approved, a second value indicating the approval request has been rejected, and a third value indicating the response to the approval request is undetermined.

14. The method according to claim 10, wherein determining that the primary account holder is unavailable further includes:
sending the encrypted approval request to the second secured banking application;
determining that no response to the approval request has been received within a predetermined period;
querying a database for user activity on the second secured banking application and determining that there has been no user activity on the second secured banking application within a second predetermined time period; and
sending a message to the primary account holder through a secondary communication channel that is different from the secured banking application in response to determining that there has been no user activity within the second predetermined period, and receiving no response to the message from the primary account holder.

15. The method according to claim 14, wherein the decrypted approval request is structured as a list of parameters and parameter values.

16. The method according to claim 15, wherein the modified approval request received from the large language model includes a natural language request including at least one parameter value from the list of parameters and parameter values.

17. The method according to claim 10, wherein the method further includes receiving a preliminary response from the large language model indicating that the approval status is unknown, and wherein the method further includes sending a follow-up message to the third device to prompt the delegate to provide a new response to the approval request.

18. A computing system operating an account management service controlling a bank account, comprising:
one or more processors configured to:
establish communication with a first secured banking application running on a first device using an application programming interface associated with the account management service;
generate an approval request having a first data format in response to receiving information about a request for funds using the first device, wherein the approval request is encrypted;
establish communication with a second secured banking application running on a second device using the application programming interface;
determine that a primary account holder associated with the second secured banking application is unavailable;
process, using a delegate communication module the approval request by:
decrypting, with a decryption module, the approval request;
removing, with a security filter, sensitive information from the decrypted approval request;
sending a query to a large language model, wherein the query includes the decrypted approval request and a prompt to convert the decrypted approval request into a natural language output, and receiving a modified approval request as a string of data comprising information in a natural language format;
retrieve contact information for a delegate authorized to approve the approval request;
automatically send the modified approval request to a third device associated with the delegate using a short messaging service;
receive a response to the modified approval request in the form of a text-based response;
send a second query to the large language model with a second prompt to convert the response into an approval status in the first data format, wherein the second query includes the text-based response, and receive an approval status;
determine that the modified approval request has been approved based on the approval status; and
send information to a secure account gateway controlling access to the bank account in response to determining that the request for funds has been approved, the information including instructions to release the requested funds.

19. The computing system according to claim 18, wherein the decrypted approval request is structured as an object data structure.

20. The computing system according to claim 18, wherein the decrypted approval request is structured as a list of parameters and parameter values.

* * * * *